US012574659B2

(12) United States Patent
Roh et al.

(10) Patent No.: US 12,574,659 B2
(45) Date of Patent: Mar. 10, 2026

(54) IMAGE SIGNAL PROCESSOR, IMAGE SENSOR, AND OPERATING METHOD OF THE IMAGE SENSOR

(71) Applicant: SAMSUNG ELECTRONICS CO., LTD., Suwon-si (KR)

(72) Inventors: Yohan Roh, Suwon-si (KR); Jeyeon Kim, Suwon-si (KR); Yeolmin Seong, Suwon-si (KR); Yongjoon Song, Suwon-si (KR); Chanwoo Ahn, Suwon-si (KR); Jeisung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 209 days.

(21) Appl. No.: 18/388,019

(22) Filed: Nov. 8, 2023

(65) Prior Publication Data

US 2024/0163578 A1      May 16, 2024

(30) Foreign Application Priority Data

Nov. 10, 2022    (KR) ........................ 10-2022-0149838

(51) Int. Cl.
| | |
|---|---|
| *H04N 25/78* | (2023.01) |
| *G06N 3/08* | (2023.01) |
| *H04N 25/68* | (2023.01) |
| *H04N 25/683* | (2023.01) |
| *H04N 25/75* | (2023.01) |

(52) U.S. Cl.
CPC .............. *H04N 25/68* (2023.01); *G06N 3/08* (2013.01); *H04N 25/683* (2023.01); *H04N 25/75* (2023.01); *H04N 25/78* (2023.01)

(58) Field of Classification Search
CPC ...... H04N 25/134; H04N 25/46; H04N 25/68; H04N 25/683; H04N 25/75; H04N 25/78; G06N 3/08
See application file for complete search history.

(56) References Cited

U.S. PATENT DOCUMENTS

| | | | |
|---|---|---|---|
| 8,860,851 B2 | 10/2014 | Goma et al. | |
| 9,131,196 B2 | 9/2015 | Lim et al. | |
| 10,303,965 B2 | 5/2019 | Schafer et al. | |
| 11,080,835 B2 | 8/2021 | Doggett et al. | |
| 11,321,822 B2 | 5/2022 | Xin et al. | |
| 2020/0396442 A1 | 12/2020 | Shin | |
| 2021/0243395 A1* | 8/2021 | Saito ....................... | H04N 25/70 |
| 2023/0071368 A1* | 3/2023 | Seo ........................... | G06T 5/60 |

* cited by examiner

*Primary Examiner* — Lin Ye
*Assistant Examiner* — Chriss S Yoder, III
(74) *Attorney, Agent, or Firm* — Sughrue Mion, PLLC

(57) ABSTRACT

An image signal processor, an image sensor, and an operating method of the image sensor are provided. The image sensor may include a pixel array including a plurality of sensing pixels each configured to convert a received light signal into an electrical signal, a readout circuit configured to convert the electrical signals into image data and output the image data, and an image signal processor configured to correct bad pixels occurring in a first pixel group of the image data, based on a neural network, encode position information representing a position of at least one bad pixel of the bad pixels to generate position data, and provide the position data to a first middle layer of a plurality of layers included in the neural network.

20 Claims, 21 Drawing Sheets

Figure 10:
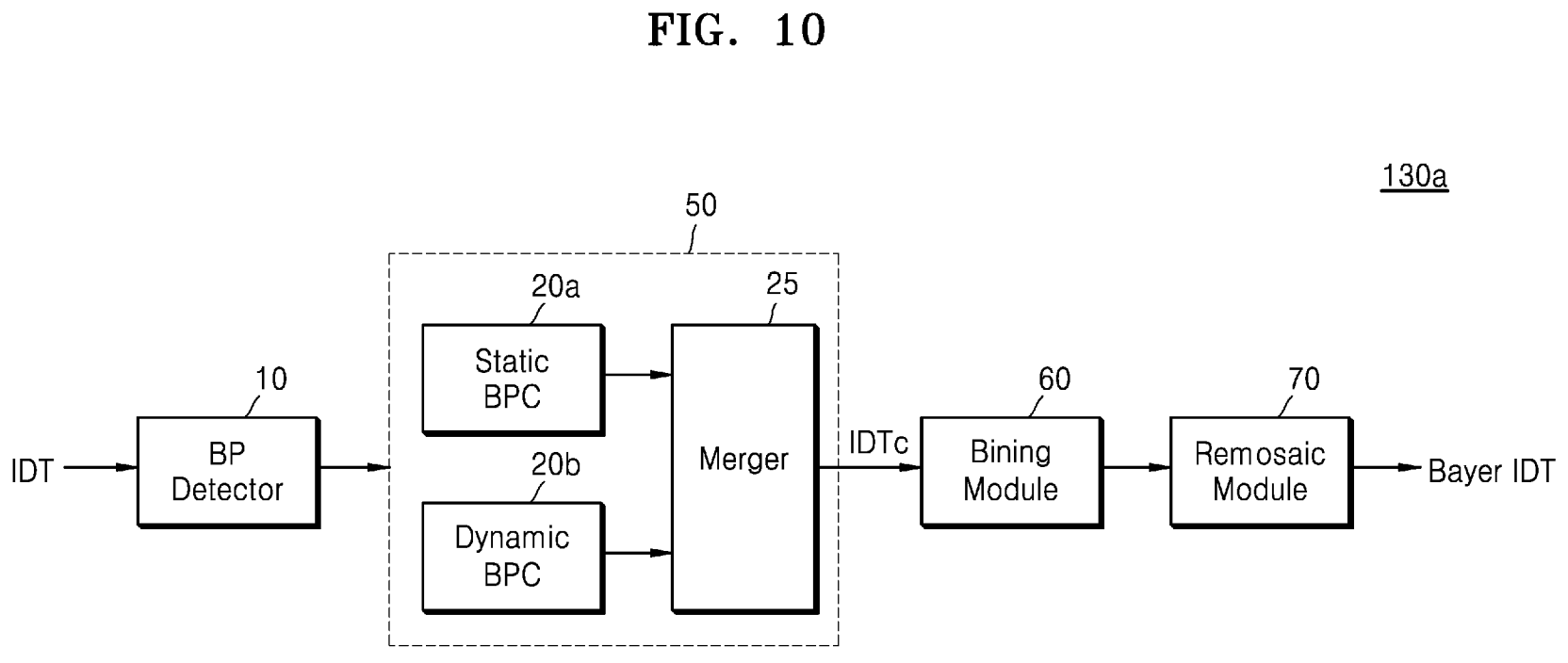

IDT → BP Detector [10]

50 → Static BPC [20a] → Merger [25] → IDTc → Bining Module [60] → Remosaic Module [70] → Bayer IDT Dynamic BPC [20b] → Merger [25]

| | |
|---|---|
| GENERATE IMAGE DATA, BASED ON RECEIVED LIGHT SIGNAL | ~S110 |
| DETECT BAD PIXEL OCCURRING IN IMAGE DATA | ~S120 |
| GENERATE INPUT DATA INCLUDING BAD PIXEL | ~S130 |
| ENCODE POSITION INFORMATION REPRESENTING POSITION OF BAD PIXEL TO GENERATE POSITION DATA | ~S140 |
| PERFORM BAD PIXEL CORRECTION PROCESSING BY USING NEURAL NETWORK, BASED ON INPUT DATA AND POSITION DATA | ~S150 |

<u>1000</u>

IMAGE SIGNAL PROCESSOR, IMAGE SENSOR, AND OPERATING METHOD OF THE IMAGE SENSOR

CROSS-REFERENCE TO RELATED APPLICATION

This application is based on and claims priority under 35 U.S.C. § 119 to Korean Patent Application No. 10-2022-0149838, filed on Nov. 10, 2022, in the Korean Intellectual Property Office, the disclosure of which is incorporated by reference herein in its entirety

BACKGROUND

1. Field

One or more embodiments of the disclosure relates to a semiconductor device, and more particularly, to an image signal processor, an image sensor, and an operating method of the image sensor to correct a bad pixel based on deep learning.

2. Description of Related Art

Recently, as the demands for photographs and videos having high quality and high image quality increase, an increased number of sensing pixels are integrated into a pixel array so as to increase a resolution of image sensors, and thus, the sensing pixels are miniaturized. However, bad pixels occur frequently at a fixed position of the pixel array due to process issues, and therefore a technology for correcting bad pixels is needed.

Deep learning (including neural network) is a technology to extract valid information from input data by using a trained neural network. Deep learning may be used to correct bad pixels, but has difficulty in real-time processing due to an excessive number of arithmetic operations.

SUMMARY

One or more embodiments of the disclosure provides an image sensor and an operating method thereof to correct bad pixels in real time based on deep learning.

According to an aspect of the disclosure, there is provided an image sensor including: a pixel array including a plurality of pixels each configured to convert a received light signal into an electrical signal, a readout circuit configured to convert the electrical signal from each of the plurality of pixels into image data and output the image data and an image signal processor configured to: provide the image data to an input layer, among a plurality of layers of a neural network, generate position data based on position information representing a position of at least one bad pixel among one or more bad pixels in a first pixel group of the image data, provide the position data to a middle layer among the plurality of layers of the neural network, and correct the one or more bad pixels in the first pixel group of the image data based on the neural network.

According to another aspect of the disclosure, there is provided an image signal processor including: a preprocessor configured to: generate input image data including a plurality of bad pixels from image data, and encode position information representing positions of the plurality of bad pixels to generate encoding data including a plurality of bits; and a neural network processor configured to perform bad pixel correction based on the input image data and the encoding data input to a neural network.

According to another aspect of the disclosure, there is provided an operating method of an image sensor for correcting a plurality of bad pixels using a neural network, the operating method including: generating image data based on a received light signal; providing the image data to an input layer, among a plurality of layers of the neural network; generating position data based on position information representing a position of at least one bad pixel among one or more bad pixels in a first pixel group of the image data; providing the position data to a middle layer among the plurality of layers of the neural network; and correcting the one or more bad pixels in the first pixel group of the image data based on the neural network.

BRIEF DESCRIPTION OF DRAWINGS

Embodiments will be more clearly understood from the following detailed description taken in conjunction with the accompanying drawings in which:

FIG. 3 illustrates an operation of a bad pixel corrector included in an image sensor, according to an embodiment;

FIGS. 8A and 8B illustrate an operation of a bad pixel corrector according to an embodiment;

FIG. 10 illustrates an implementation example of an image processor according to an embodiment;

DETAILED DESCRIPTION

Hereinafter, various embodiments will be described in detail with reference to the accompanying drawings.

The various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
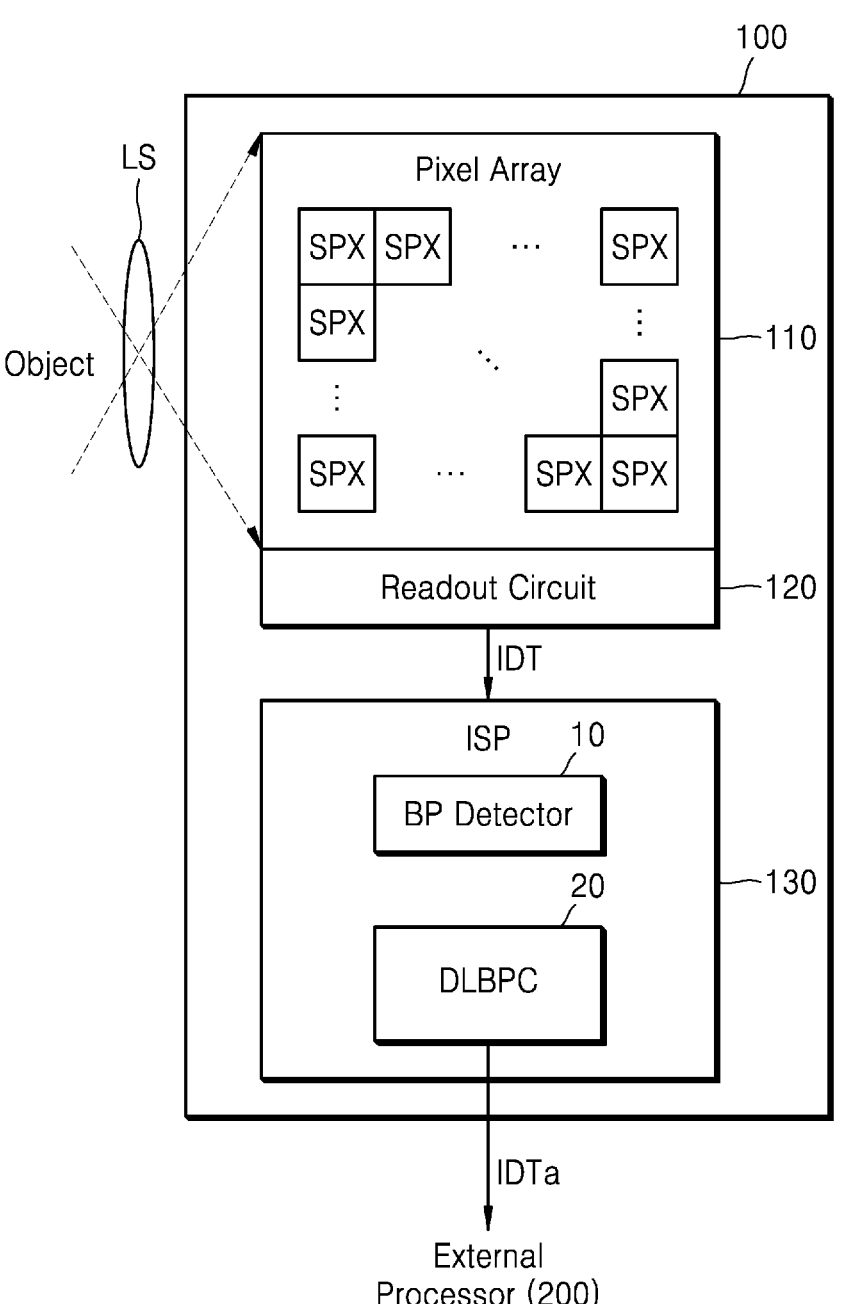
FIG. 1 is a block diagram illustrating an image sensor according to an embodiment.

FIG. 1 is a block diagram illustrating an image sensor 100 according to an embodiment.

The image sensor 100 may convert an optical signal of an object, which is incident through an optical lens LS, into image data. The image sensor 100 may be provided in an electronic device having an image capturing function or light sensing function. For example, the image sensor 100 may be provided in electronic devices such as digital still cameras, digital video cameras, smartphones, wearable devices, Internet of things (IoT) devices, tablet personal computers (PCs), personal digital assistants (PDAs), portable multimedia players (PMPs), and navigation devices. Also, the image sensor 100 may be provided in electronic devices provided as parts in vehicles, furniture, manufacturing facilities, doors, and various measurement equipment.

Referring to FIG. 1, the image sensor 100 may include a pixel array 110, a readout circuit 120, and an image signal processor (ISP) 130. The image sensor 100 may further include other elements, such as a memory and an interface circuit. However, the disclosure is not limited thererto, and as such, image sensor 100 may include other elements generally provided in an image process. The image signal processor 130 may include a bad pixel (BP) detector 10 and a neural network-based bad pixel corrector 20 (or referred to as a bad pixel correction circuit). In an embodiment, the pixel array 110, the readout circuit 120, and the ISP 130 may be implemented as a single semiconductor chip or a single semiconductor module. However, the disclosure is not limited thereto, and as such, according to other embodiments, the components of the image sensor 100 may be implemented on more than a signal semiconductor chip. For example, in an embodiment, the pixel array 110 and the readout circuit 120 may be implemented as one semiconductor chip, and the ISP 130 may be implemented as another semiconductor chip.

The pixel array 110 may be implemented as, for example, a photoelectric conversion device such as a charge coupled device (CCD) or a complementary metal oxide semiconductor (CMOS), and moreover, may be implemented as various kinds of photoelectric conversion devices. The pixel array 110 may include a plurality of sensing pixels SPX, which convert a received light signal (light) into an electrical signal, and the plurality of sensing pixels SPX may be arranged in a matrix form. The plurality of sensing pixels SPX may each include a photo sensing device. For example, the photo sensing device may include a photodiode, a photo transistor, a photo gate, or pinned photodiode.

According to an embodiment, a color filter array may be provided on the pixel array 110. The color filter array may be an array of color filters which are respectively provided on the plurality of sensing pixels SPX so as to capture color information. A color band (for example, a frequency band), which is sensed from a received light signal by using a sensing pixel, may be determined based on a color of a color filter corresponding to the sensing pixel SPX. For example, a red color filter may be provided on a red sensing pixel which senses a signal of a frequency band of a red color from a received light signal. The color filter array may have various color patterns. This will be described below with reference to FIGS. 2A and 2B.

Figure 2A:
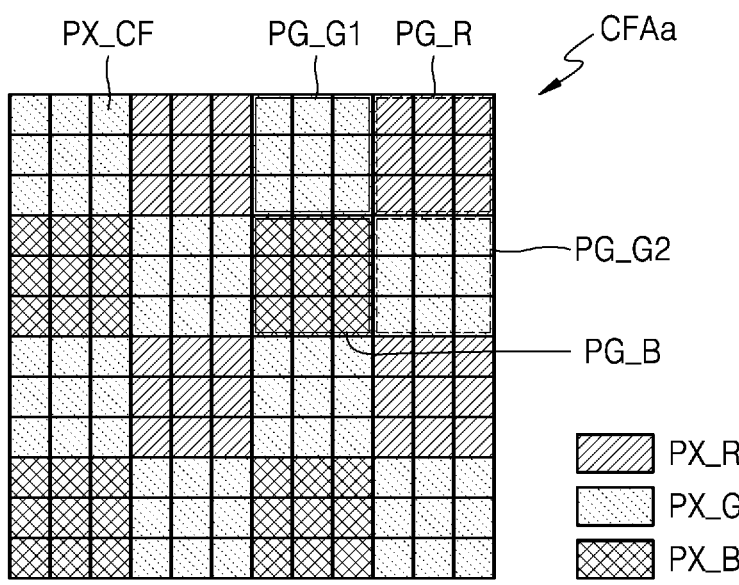
FIGS. 2A and 2B illustrate implementation examples of a color filter array applied to an image sensor according to an embodiment.
Figure 2B:
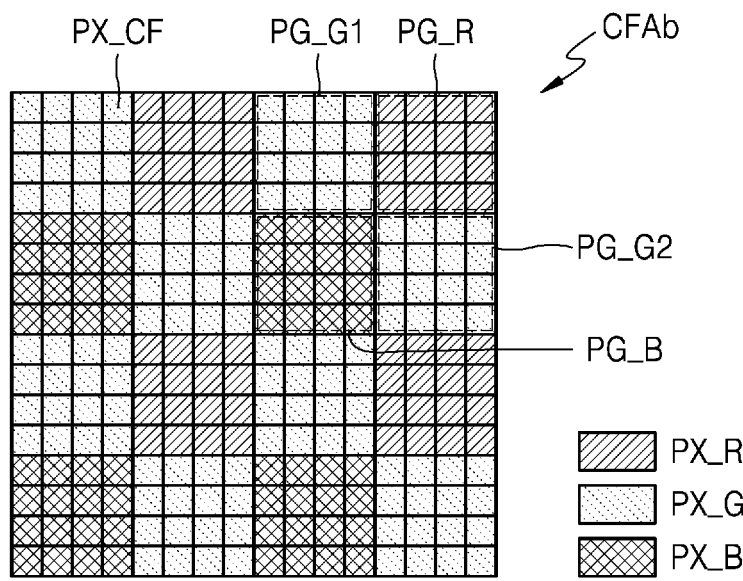

FIGS. 2A and 2B illustrate implementation examples of a color filter array applied to an image sensor according to an embodiment.

Referring to FIGS. 2A and 2B, a color filter array CFAa may include a super Bayer pattern. A Bayer pattern may denote a pattern where a red pixel (PX_R), a green pixel (PX_G), and a blue pixel (PX_B) are alternately arranged so that a green color is 50% and each of a red color and a blue color is 25%, based on a visual characteristic of a person which is the most sensitive to the green color. The super Bayer pattern may include a red pixel group (PG_R), a blue pixel group (PG_B), a first green pixel group (PG_G1), and a second green pixel group (PG_G2) each including the same color pixels based on the arrangement of a Bayer pattern. Here, the first green pixel group (PG_G1) may denote a green pixel group which is arranged in the same column as the red pixel group (PG_R), and the second green pixel group (PG_G2) may denote a green pixel group which is arranged in the same column as the blue pixel group (PG_B).

Referring to FIG. 2A, each of a red pixel group (PG_R), a blue pixel group (PG_B), a first green pixel group (PG_G1), and a second green pixel group (PG_G2) may include pixels PX_CF of three (3) rows and three (3) columns (hereinafter referred to as a 3×3 matrix). Nine (9) red pixels PX_R arranged in a 3×3 matrix may be arranged to be diagonal with respect to nine (9) blue pixels PX_B arranged in a 3×3 matrix. Also, nine (9) green pixels PX_G arranged in a 3×3 matrix may be arranged to be diagonal with respect to nine (9) other green pixels PX_G arranged in a 3×3 matrix.

Referring to FIG. 2B, in a color filter array CFAb, each of a red pixel group (PG_R), a blue pixel group (PG_B), a first green pixel group (PG_G1), and a second green pixel group (PG_G2) may include sixteen (16) pixels PX_CF arranged in a 4×4 matrix. Sixteen (16) red pixels PX_R arranged in a 4×4 matrix may be arranged to be diagonal with respect to sixteen (16) blue pixels PX_B arranged in a 4×4 matrix. Also, sixteen (16) green pixels PX_G arranged in a 4×4 matrix may be arranged to be diagonal with respect to sixteen (16) other green pixels PX_G arranged in a 4×4 matrix.

The super Bayer pattern has been described above with reference to FIGS. 2A and 2B. In FIGS. 2A and 2B, it has been described that each of the red pixel group (PG_R), the blue pixel group (PG_B), the first green pixel group (PG_G1), and the second green pixel group (PG_G2) includes pixels PX_CF of the same color arranged in a 3×3 matrix, or includes pixels PX_CF of the same color arranged in a 4×4 matrix. However, the disclosure is not limited thereto, and in various super Bayer patterns, a pixel group may include the same color pixels PX_CF arranged as N×N pixels (where N is an integer of 2 or more). Also, in an embodiment, a combination of red, blue, and green colors of the color filter arrays CFAa and CFAb may be changed to a combination of other colors. For example, red, blue, and green may be replaced with cyan, magenta, and yellow.

Referring again to FIG. 1, the readout circuit 120 may convert electrical signals, received from the pixel array 110, into image data IDT. The readout circuit 120 may amplify the electrical signals and may convert the amplified electrical signals from analog to digital signal. For example, the readout circuit 120 may include an amplifier to amplify the electrical signals and an analog to digital converter (ADC) to convert the amplified electrical signals from analog to digital signal. The image data IDT generated by the readout circuit 120 may include pixel values respectively corresponding to sensing pixels SPX of the pixel array 110. The readout circuit 120 and the pixel array 110 may be referred to as a sensing core.

The ISP 130 may perform image processing on the image data IDT output from the readout circuit 120. The ISP 130 may perform bad pixel correction on the image data IDT. Furthermore, the ISP 130 may perform image processing such as noise removal, remosaic, and binning on the image data IDT.

The bad pixel detector 10 may detect a bad pixel from the image data IDT. Moreover, the bad pixel detector 10 may detect a type of the bad pixel. The bad pixel detector 10 may detect whether the bad pixel is a static bad pixel occurring at a fixed position (i.e., a certain position) of the image data IDT or a dynamic bad pixel randomly occurring in the image data IDT, based on static bad pixel information. For example, static bad pixel information may be stored in the image sensor 100 (e.g., stored in a memory of the image sensor 100). The static bad pixel may include a cluster bad pixel which is generated by configuring a cluster with a plurality of adjacent bad pixels (e.g., two or more adjacent bad pixels), or may further include a cluster bad pixel and at least one additional bad pixel. Here, the cluster bad pixel or the cluster bad pixel and the at least one additional bad pixel may correspond to the same color.

The bad pixel corrector 20 may correct the bad pixel of the image data IDT, based on deep learning. For example, bad pixel corrector 20 may correct the bad pixel of the image data IDT based on the deep learning process using a neural network. The bad pixel corrector 20 may be referred to as a deep learning-based bad pixel corrector (DLBPC). In an embodiment, the bad pixel corrector 20 may be implemented with hardware. However, the disclosure is not limited thereto, and the bad pixel corrector 20 may be implemented with software or a combination of hardware and software.

Figure 3:
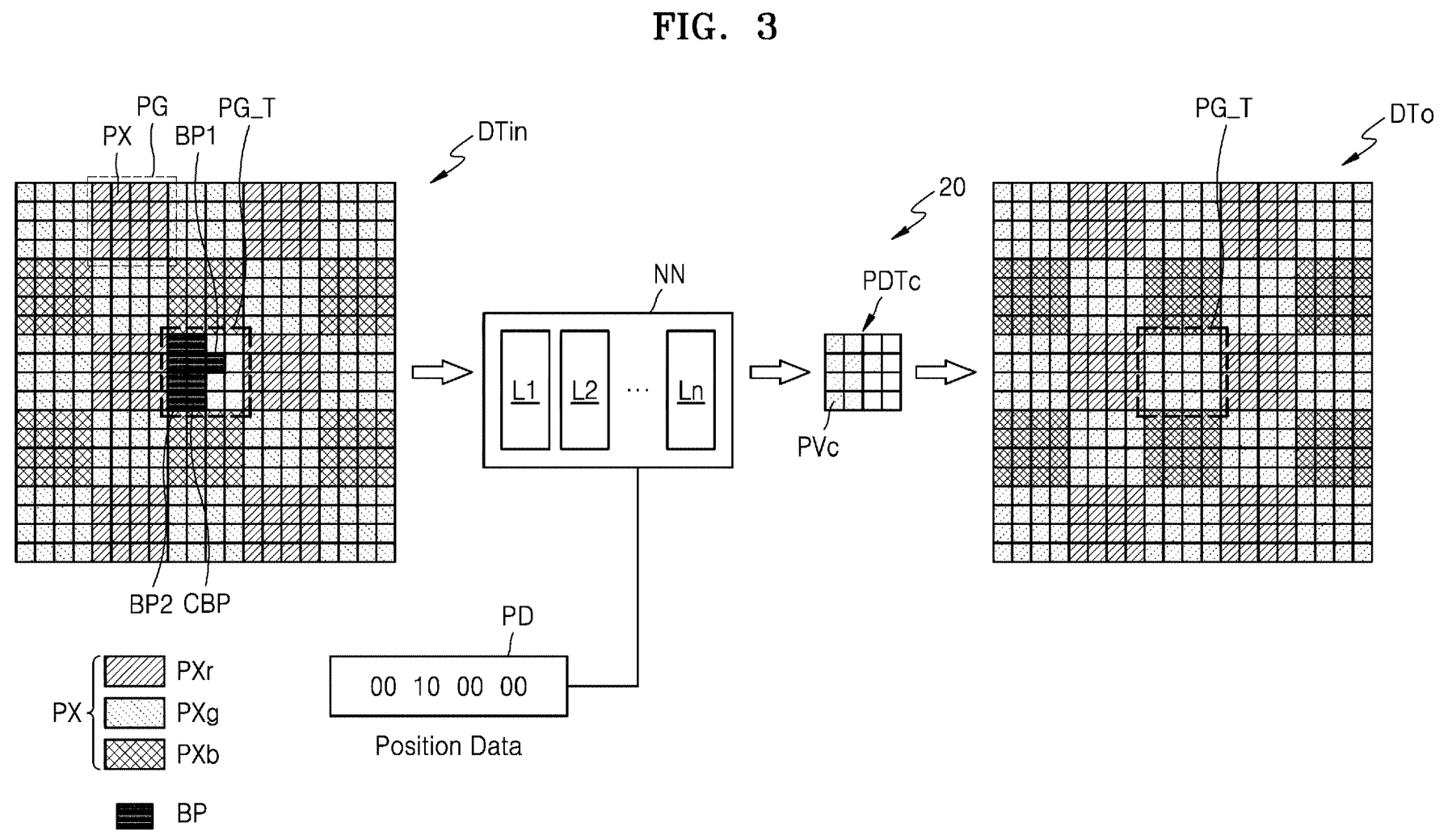

FIG. 3 illustrates an operation of a bad pixel corrector included in an image sensor, according to an embodiment.

Referring to FIG. 3, a bad pixel corrector 20 may include a neural network NN. The bad pixel corrector 20 may be same as the bad pixel corrector 20 illustrated in FIG. 1. The neural network NN may include a deep learning model which is trained to correct a bad pixel BP and may generate corrected pixel data PDTc including a corrected pixel value PVc corresponding to the bad pixel BP, based on input data DTin (or referred to as input image data). The corrected pixel value PVc may be applied as a pixel value of the bad pixel BP, and thus, output data DTo, in which, the bad pixel BP has been corrected may be generated.

According to an embodiment, image data may include a super Bayer pattern, and each pixel group PG may include pixels of the same color arranged in a 4×4 matrix (for example, red pixels PXr, blue pixels PXb, and green pixels PXg). The image data may be IDT of FIG. 1. The bad pixel corrector 20 may generate the input data DTin including the bad pixel BP and may input the input data DTin to the neural network NN.

The input data DTin may be two-dimensional (2D) data including a plurality of pixel groups PG arranged in a matrix. A target pixel group PG_T including at least one bad pixel BP may be arranged at a center of the input data DTin. For example, as illustrated in FIG. 3, the input data DTin may include 25 pixel groups PG arranged in a 5×5 matrix. In other words, the input data DTin may include pixels PX arranged in a 20×20 matrix.

The target pixel group PG_T may include at least one bad pixel BP. In an embodiment, the target pixel group PG_T may include a plurality of bad pixels BP. In an embodiment, the target pixel group PG_T may include a cluster bad pixel CBP where a plurality of bad pixels BP are arranged adjacent to one another. In an embodiment, the target pixel group PG_T may further include a cluster bad pixel CBP and at least one bad pixel BP. For example, the cluster bad pixel CBP and the at least one bad pixel BP may refer to a case in which a plurality of bad pixels BP are arranged adjacent to one another in a region (e.g., left half region or upper half region) in the target pixel group PG_T, and at least one additional bad pixel BP is located in not in the region.

For example, as illustrated in FIG. 3, the target pixel group PG_T may include at least one bad pixel BP1 (hereinafter referred to as a first bad pixel) arranged in a first direction (for example, the right) in the target pixel group PG_T and a cluster bad pixel CBP including eight bad pixels BP2 (hereinafter referred to as a second bad pixel) arranged in a 4×2 matrix in a second direction (for example, the left) opposite to the first direction.

The neural network NN may perform bad pixel processing on the input data DTin to generate corrected pixel data PDTc. The neural network NN may include a deep neural model which is trained to correct a bad pixel BP. The deep learning model may include a plurality of layers (for example, first to nth layers L1, L2, and Ln). In an embodiment, the neural network NN may include a deep neural model which is trained to correct a cluster bad pixel CBP and at least one first bad pixel BP1, based on training data of various cases including the cluster bad pixel CBP and the at least one first bad pixel BP1 of the target pixel group PG_T.

Here, the bad pixel corrector 20 may encode position information representing a position of a bad pixel BP to generate position data PD and may provide the neural network NN with the position data PD along with the input data DTin. In an embodiment, the bad pixel corrector 20 may provide the input data DTin to an input layer of a plurality of layers and may directly provide the position data PD to a middle layer of the plurality of layers. For example, the neural network NN may include at least one convolution layer and at least one fully connected layer, and the middle layer provided with the position data PD may be a fully connected layer.

In an embodiment, the bad pixel corrector 20 may encode a bad pixel map representing a bad pixel BP of pixels PX of the input data DTin to generate encoded data (for example, the position data PD). The position data PD may include a plurality of bits. In an embodiment, the position data PD may include eight bits corresponding to each of right pixels PX of a 4×2 matrix, and not including left pixels PX of a 4×2 matrix corresponding to a cluster bad pixel PX (CBP) among pixels PX of a 4×4 matrix of the target pixel group PG_T. The cluster bad pixel (CBP) occur at the same location within the target pixel group PG_T, and the neural network (NN) may be trained based on training data from various cases including cluster bad pixels (CBP) at the same location within the target pixel group (PG_T), so the neural network (NN) may know that the entire left pixels PX of a 4×2 matrix among pixels PX of a 4×4 matrix of the target pixel group PG_T correspond to the cluster bad pixel PX (CBP). A bit corresponding to the first bad pixel BP1 may include a flag value (for example, '1') representing a bad pixel, and other bits may include a flag value (for example, '0') representing a normal pixel instead of a bad pixel. Accordingly, the position data PD may include bit values "00 10 00 00". However, the disclosure is not limited thereto, and in an embodiment, the position data PD may include 16 bits corresponding to each of pixels PX of a 4×4 matrix of the target pixel group PG_T. In an embodiment, the position data PD may include a flag to indicate that the entire left pixels PX of a 4×2 matrix corresponding to the cluster bad pixel PX (CBP) among pixels PX of a 4×4 matrix of the target pixel group PG_T. However, the disclosure is not limited thererto, and as such, information about the cluster bad pixel PX (CBP) may be provided to the neural network (NN) in a different manner.

The corrected pixel data PDTc may include pixel values PVc corresponding to each of at least one first bad pixel BP1 and second bad pixels BP2 included in the cluster bad pixel CBP. The second bad pixels BP2 and the at least one first bad pixel BP1 of the target pixel group PG_T may be replaced with the corrected pixel data PDTc.

In FIG. 3, an example has been described where the pixel group PG includes pixels PX arranged in a 4×4 matrix and the input data DTin includes pixel groups PG arranged in a 5×5 matrix. However, the disclosure is not limited thereto, and the pixel group PG may include N×N pixels (where N is an integer of 2 or more) of the same color and the input data DTin may include 9 or more pixel groups PG or 25 or more pixel groups PG arranged in a matrix.

Referring again to FIG. 1, when a plurality of bad pixels BP are arranged to have a second pattern in the target pixel group PG_T, the bad pixel corrector 20 may flip (vertically flip or horizontally flip) input data (DTin of FIG. 3) to generate flipped input data and may provide the flipped input data to the neural network NN. Alternatively, the bad pixel corrector 20 may generate some image data including the target pixel group PG_T and a peripheral pixel group and may flip (vertically flip or horizontally flip) the some image data to generate the input data DTin.

Here, a neural network (NN of FIG. 3) may include a deep neural model trained based on training data where a plurality of bad pixels BP are arranged to have a first pattern symmetrical with the second pattern. The neural network NN may not be trained based on training data where a plurality of bad pixels BP are arranged to have the second pattern, and thus, when the input data DTin including the bad pixels BP having the second pattern is input in an intact manner (e.g., "as is") to the neural network NN, accurate corrected pixel data PDTc may not be generated. Therefore, the bad pixel corrector 20 may flip the input data DTin and may process flipped input data, based on the neural network NN. In this case, the position data PD may represent positions of bad pixels BP, based on the flipped input data.

In an embodiment, the neural network NN may include a plurality of networks respectively corresponding to colors included in the image data IDT, and the bad pixel corrector 20 may perform bad pixel correction by using a corresponding network, based on a color of a channel where a bad pixel BP occurs. A configuration and an operation of the bad pixel corrector 20 will be described below in detail with reference to the other drawings.

Referring again to FIG. 1, image-processed image data IDTa may be provided to an external processor 200. The external processor 200 may be a main processor or a graphics processor of an electronic device provided with the image sensor 100. The external processor 200 may perform processing on the image-processed image data IDTa. For example, the external processor 200 may perform additional processing on the image-processed image data IDTa to improve image quality or decrease a resolution of the image data IDTa, or may store the image-processed image data IDTa, display the image-processed image data IDTa by using a display, or provide the image-processed image data IDTa to an element which performs an operation based on the image-processed image data IDTa.

As described above, in the image sensor 100 according to an embodiment, the ISP 130 including the bad pixel corrector 20 implemented based on deep learning may correct a bad pixel (BP of FIG. 3) occurring at a fixed position of the image data IDT. The ISP 130 may encode position information representing a position of the bad pixel BP to generate position data (PD of FIG. 3) including a plurality of bits and may provide the position data PD to one layer of a neural network used for bad pixel correction. In this case, a layer to which the position data PD is input may be a middle layer of the neural network. Each of a plurality of bits of the position data PD may include flag values representing whether a corresponding pixel is a bad pixel. In a neural network in which a position of a bad pixel BP is reflected, as described above, the number of arithmetic operations of the neural network NN may be reduced and the performance of the neural network NN may be improved. For example, in a case, in which, position information is encoded into the position data and provided to the neural network NN, the number of arithmetic operations of the neural network NN may be decreased and the performance of the neural network NN may be enhanced, as compared to a case, in which, a 2D bad pixel map representing a position of a bad pixel is provided to the neural network NN. Also, a burden for determining a position of a bad pixel (for example, a first bad pixel) in a bad pixel map by using the neural network NN may be reduced.

Also, the ISP 130 may flip input data including a bad pixel for each pattern and may use flipped input data, and thus, the complexity of a problem which has to be solved by a neural network may decrease, thereby reducing the amount of training of a neural network and a time taken in training. The image sensor 100 may process a bad pixel of the image data IDT in real time, based on the neural network NN which is weight-lightened, and the visibility of a bad pixel may decrease in the image data IDTa (for example, the image data IDTa provided from an external processor) which is output through image processing.

Figure 4:
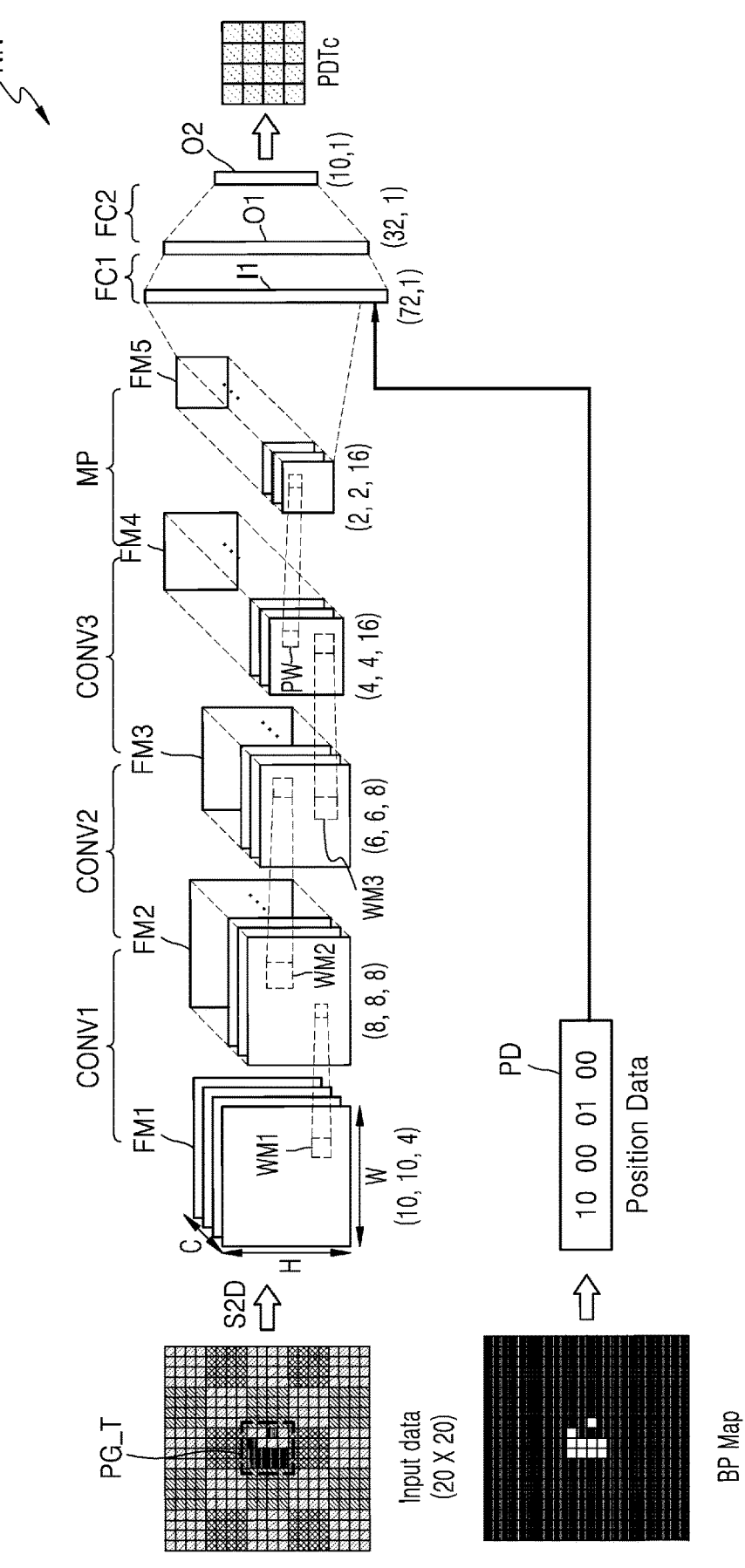
FIG. 4 illustrates an example of a structure of a neural network according to an embodiment.

FIG. 4 illustrates an example of a structure of a neural network NN according to an embodiment.

Referring to FIG. 4, the neural network NN may include a first convolution layer CONV1, a second convolution layer CONV2, a third convolution layer CONV3, a max pooling layer MP, a first fully connected layer FC1, and a second fully connected layer FC2. As described above, the neural network NN may include a plurality of layers, and the neural network NN having a multi-layered structure may be referred to as a deep neural network (DNN) or a deep learning architecture. However, the number of layers are not limited to the illustration in FIG. 4, and as such, according to another embodiment, the number of layers may be different.

Each of the plurality of layers may perform an arithmetic operation on a feature map input into the corresponding one of the plurality of layers to generate an output feature map or an output. The output feature map of each layer may be provided as an input feature map of a next layer. The feature map may denote data where various features of input data are expressed, and each of feature maps may have a 2D matrix or three-dimensional (3D) matrix (or referred to as a tensor) form, which includes a plurality of feature values. The feature maps may have a height H (or a row), a width W (or a column), and a channel number C, and the channel number C may be referred to as a depth. The feature map may include a first feature map FM1, a second feature map FM2, a third feature map FM3, a fourth feature map FM4, and a fifth feature map FM5. For example, a first feature map FM1, a second feature map FM2, a third feature map FM3, a fourth feature map FM4, and a fifth feature map FM5.

The input data (for example, pixels PX arranged in a 20×20 matrix) may include bad pixels. For example, the input data may include second bad pixels of a 4×2 matrix (four rows and two columns) configuring a cluster bad pixel and two first bad pixels. In other words, the input data may include ten bad pixels.

The input data may be generated as a first feature map FM1 through space to depth (S2D) conversion. Digits (for example, 10, 10, and 4) in parenthesis in FIG. 4 representing a size of the first feature map FM1 may respectively represent a height (row), a width (column), and a channel number. An input including pixels PX of a 20×20 matrix may be converted into the first feature map FM1 including four channels including features of a 10×10 matrix.

A convolution layer may perform convolution on an input feature map and one or more weight maps to generate an output feature map. For example, the first convolution layer CONV1 may perform convolution on the first feature map FM1 and a first weight map WM1 to generate a second feature map FM2. A weight map (for example, the first weight map WM1) may include a plurality of weights and may have a 2D matrix or 3D matrix form. The weight map may filter the input feature map and may be referred to as a filter or a kernel. The number of channels of the weight map (for example, the first weight map WM1) may be the same as the number of channels of the input feature map (for example, the first weight map WM1), and convolution may be performed on the same channels of the input feature map and the weight map.

The first weight map WM1 may be shifted based on a traversal method using the first feature map FM1 as a sliding window. While each shift is being performed, each of weights included in the first weight map WM1 may be multiplied by all feature values in a region overlapping the first feature map FM1, and results of the multiplication may be added. As convolution is performed on the first feature map FM1 and the first weight map WM1, one channel of the second feature map FM2 may be generated. The number of weight maps may be the same as the number of channels of an output feature map (for example, the second feature map FM2). For example, in the first convolution layer CONV1, convolution may be performed on eight first weight maps WM1 and the first feature map FM1, and thus, the second feature map FM2 including eight channels may be generated. A size (for example, a height, a width, and a channel number) of the second feature map FM2 may respectively be 8, 8, and 8.

The second convolution layer CONV2 may perform convolution on the second feature map FM2 and a weight map (for example, one or more second weight maps WM2) to generate a third feature map FM3, and the third convolution layer CONV3 may perform convolution on the third feature map FM3 and a weight map (for example, one or more third weight maps WM3) to generate a fourth feature map F4. A size (for example, a height, a width, and a channel number) of the third feature map FM3 may respectively be 6, 6, and 8, and a size (for example, a height, a width, and a channel number) of the fourth feature map FM4 may respectively be 4, 4, and 16.

The max pooling layer MP may slide an input feature map (for example, the fourth feature map FM4) by size units of a pooling window PW by using the pooling window PW to select a maximum value from among feature values of a region overlapping the pooling window PW. Accordingly, an output feature map (for example, a fifth feature map FM5) where a spatial size is reduced may be generated. A size (for example, a height, a width, and a channel number) of the fifth feature map FM5 may respectively be 2, 2, and 16.

The fifth feature map FM5 may be flattened and generated as a one-dimensional (1D) vector having 64 values, and the 1D vector may be provided as an input I1 of the first fully connected layer FC1. At this time, position data PD which is generated as position information about a bad pixel is encoded into the 1D vector may be provided as the input I1 of the first fully connected layer FC1. In other words, the position data PD may be added to the 1D vector generated based on the fifth feature map FM5, and thus, the 1D vector and the position data PD may be provided as the input I1 of the first fully connected layer FC1.

In an embodiment, the position data PD may include eight bits corresponding to each of the other pixels PX of a 4×2 matrix not including second bad pixels PX of a 4×2 matrix configuring a cluster bad pixel among pixels PX of a 4×4 matrix of the target pixel group PG_T including bad pixels. Two bits corresponding to a first bad pixel among the eight bits may have a flag value (for example, '1') representing a bad pixel, and six bits corresponding to the other normal pixels may have a flag value (for example, '0') representing a normal pixel. Accordingly, the position data PD representing position information about the first bad pixel included in the input data of FIG. 4 may be "10000100". However, the inventive concept is not limited thereto, and in an embodiment, the position data PD may include 16 bits corresponding to each of pixels PX of a 4×4 matrix of the target pixel group PG_T.

The first fully connected layer FC1 may multiply the input I1 by a weight of each class having the same dimension and may apply a result of the multiplication to an activation function to generate an output including 1D output values. The first fully connected layer FC1 may generate a first output O1 including 32 output values (for example, an output value of 32 rows, 1 column). The second fully connected layer FC2 may generate a second output O2 including 10 output values (for example, an output value of 10 rows, 1 column), based on the first output O1.

The second output O2 may be output as corrected pixel data PDTc having corrected second pixel values and two corrected first pixel values of a 4×2 matrix (4 rows, 2 columns). In this case, the corrected second pixel values of a 4×2 matrix (4 rows, 2 columns) may be respectively applied as pixel values of second bad pixels included in a cluster bad pixel, and two corrected second pixel values may be respectively applied as pixel values of two second bad pixels.

According to a comparative example, position information representing a position of a bad pixel may be provided as a 2D bad pixel map to the neural network NN. The bad pixel map may be provided as a portion of the first feature map FM1 to an input layer (for example, the first convolution layer CONV1) of the neural network NN. In this case, the bad pixel map may be generated as a plurality of channels of the first feature map FM1. Therefore, the number of channels of the first feature map FM1 may increase. For example, the number of channels of the first feature map FM1 may increase from four to eight. Accordingly, the number of operations of the first convolution layer CONV1 may largely increase. When the neural network NN is implemented with hardware, the number of gates may largely increase.

However, as described above, an ISP (130 of FIG. 1) according to an embodiment may encode position information about a bad pixel to generate the position data PD including a plurality of bits and may provide the position data PD to a middle layer (for example, the first fully connected layer FC1) of the plurality of layers of the neural network NN. An input I1 of the first fully connected layer FC1 may increase by the number of bits included in the position data PD, and thus, the amount of increase in number of operations of the neural network NN may be far less than the amount of increase according to the comparative example.

In FIG. 4, sizes of outputs of each layer (for example, the first to fifth feature maps FM1 to FM5 and the first and second outputs O1 and O2) are illustrated, but the sizes of the outputs of each layer may vary and the number of bad pixels included in a cluster bad pixel may vary also. The number of rows and columns of corrected pixel values included in the corrected pixel data PDTc may be the same as the number of rows and columns of bad pixels included in a cluster bad pixel.

Also, in FIG. 4, the neural network NN is illustrated as including six layers including a convolution layer, a max pooling layer, and a fully connected layer, but this may be merely an embodiment and the number and kinds of layers of the neural network NN may vary. For example, in an operation of designing the neural network NN, the number and kinds of layers may be determined based on the performance and number of operations of the neural network NN.

FIGS. 5A to 5F illustrate position data according to an embodiment.

Figure 5A:
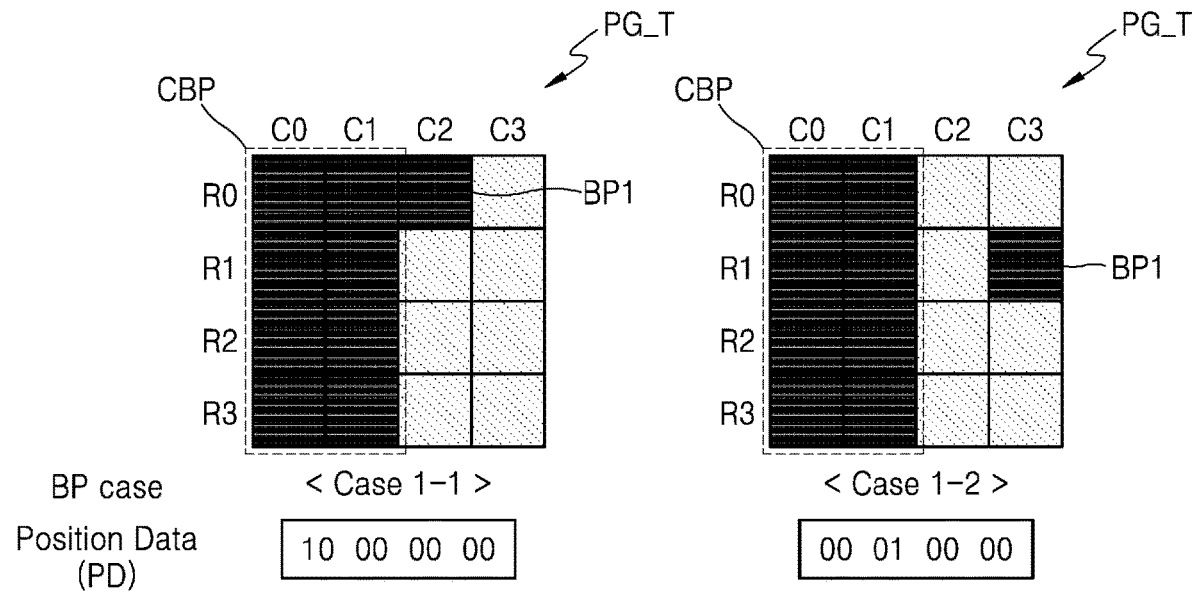
FIGS. 5A to 5F illustrate position data according to an embodiment.
Figure 5B:
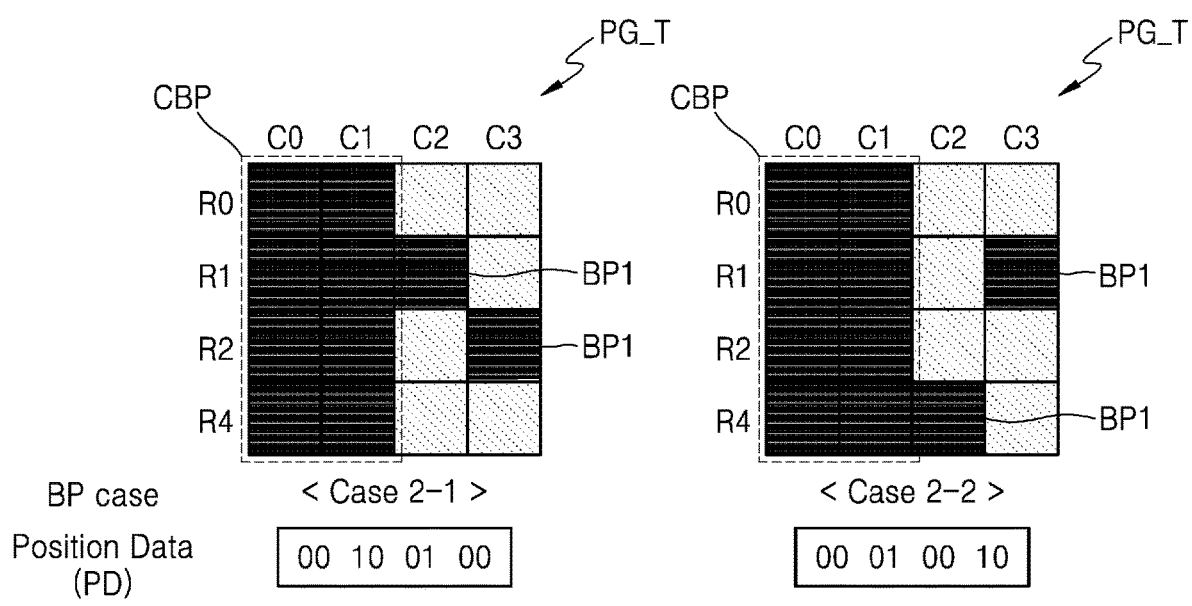
Figure 5C:
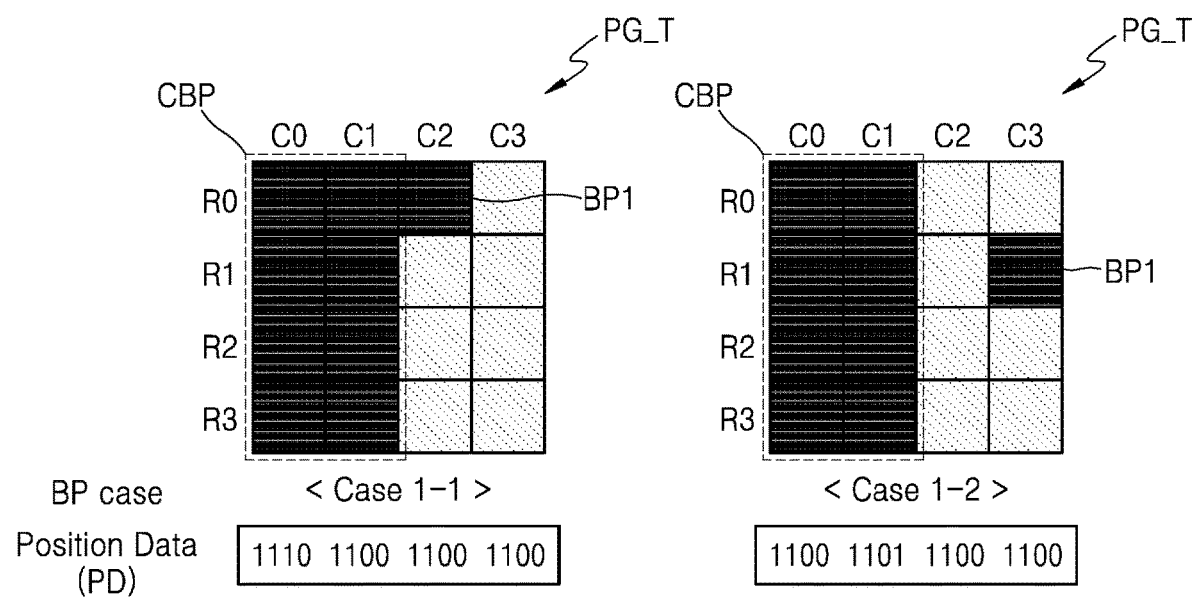
Figure 5D:
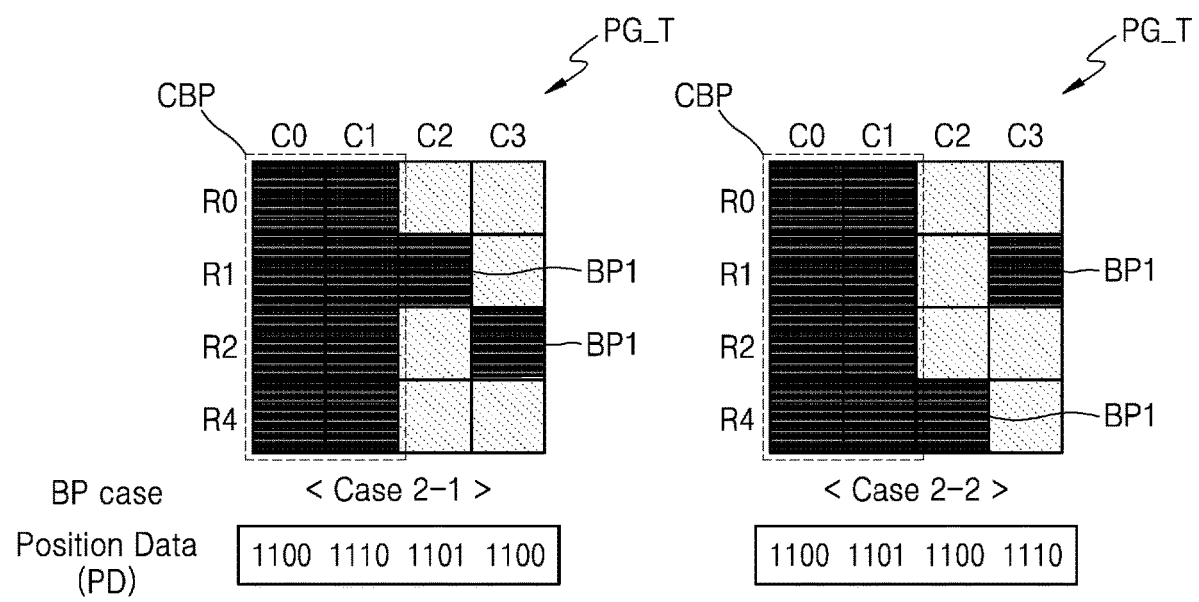
Figure 5E:
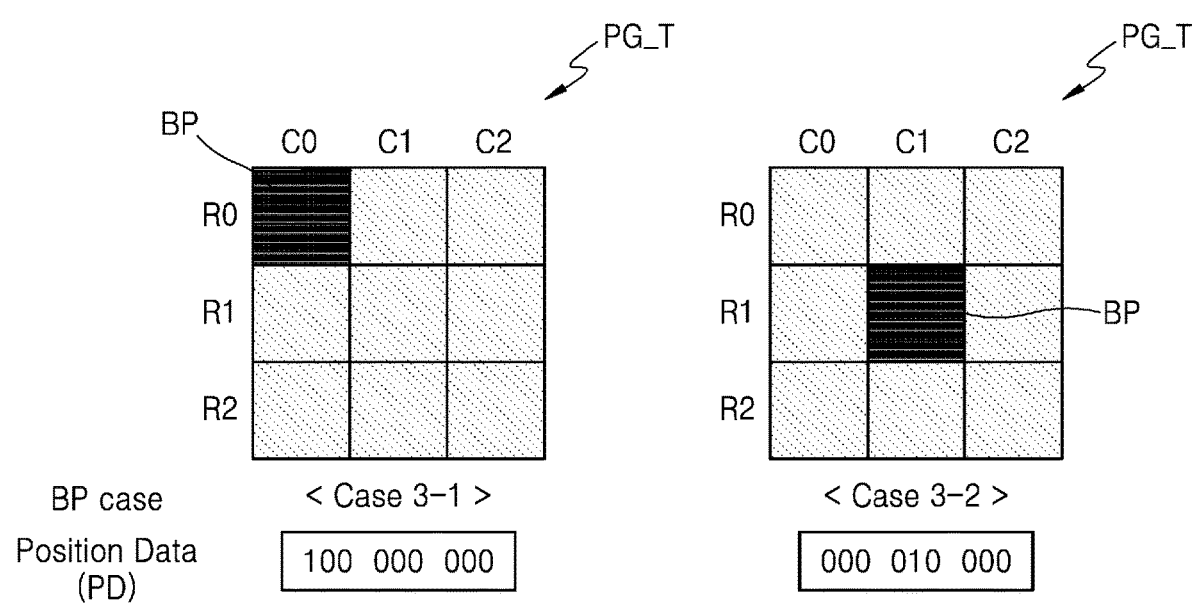
Figure 5F:
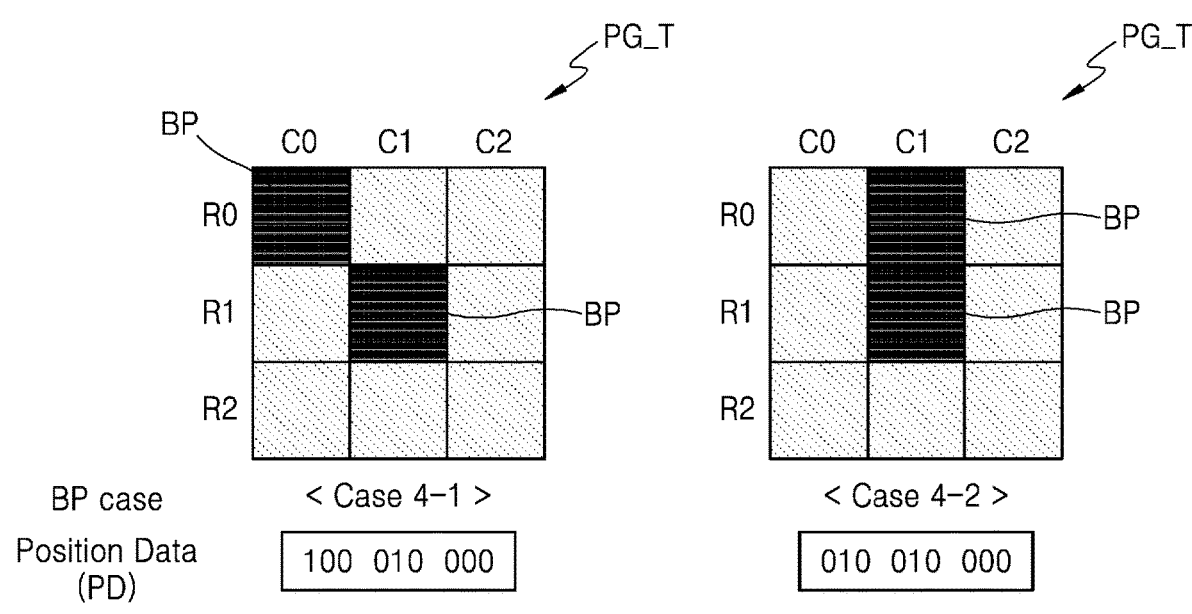

FIGS. 5A to 5F illustrate pixel data for each case of a bad pixel, FIGS. 5A to 5D illustrate a case where a pixel group includes 16 pixels of a 4×4 matrix, and FIGS. 5E and 5F illustrate a case where a pixel group includes 9 pixels of a 3×3 matrix.

Referring to FIG. 5A, a bad pixel may include a cluster bad pixel CBP occurring at a fixed position in a target pixel group PG_T and one first bad pixel BP1 generated at a random position.

Because the cluster bad pixel CBP occurs fixedly at the same position, position data PD may represent a position of the first bad pixel BP1 among pixels of a 4×2 matrix not including the cluster bad pixel CBP among the pixels of a 4×2 matrix of the target pixel group PG_T. The position data PD may include 8 bits, and the 8 bits may respectively correspond to pixels of a 4×2 matrix arranged in first to fourth rows R0 to R3 and third and fourth columns C2 and C3. Bit values of the position data PD may correspond to a pixel arranged in from the third column C2 of the first row R0 to the fourth column C3 of the fourth row R3. A flag value representing whether a pixel of the first row R0 and the third column C2 is a bad pixel may correspond to a most significant bit of the position data PD, and a flag value representing whether a pixel of the fourth row R3 and fourth column C4 is a bad pixel may correspond to a least significant bit of the position data PD.

In a case 1-1, the first bad pixel BP1 may be arranged in the first row R0 and the third column C2 (hereinafter referred to as (R0, C2)). Therefore, a bit corresponding to a pixel of (R0, C2) in the position data PD may have '1' which is a flag value representing a bad pixel. Bits corresponding to the other pixels may have '0' which is a flag value representing a normal pixel. Accordingly, the position data PD may have a data value "10000000".

In a case 1-2, the first bad pixel BP1 may be arranged in (R1, C3). Therefore, a bit corresponding to a pixel of (R1, C3) may have '1' which is a flag value representing a bad pixel. Bits corresponding to the other pixels may have '0' which is a flag value representing a normal pixel. Accordingly, the position data PD may have a data value "00010000".

Referring to FIG. 5B, a bad pixel may include a cluster bad pixel CBP occurring at a fixed position in a target pixel group PG_T and two first bad pixels BP1 generated at random positions.

In a case 2-1, the first bad pixel BP1 may be arranged in (R1, C2) and (R2, C3). Therefore, bits corresponding to pixels of (R1, C2) and (R2, C3) in the position data PD may have '1' which is a flag value representing a bad pixel, and thus, the position data PD may have a data value "00100100".

In a case 2-2, the first bad pixel BP1 may be arranged in (R1, C3) and (R4, C2). Therefore, bits corresponding to pixels of (R1, C3) and (R4, C2) in the position data PD may have '1' which is a flag value representing a bad pixel, and thus, the position data PD may have a data value "00010010".

Referring to FIGS. 5C and 5D, position data PD may include 16 bits corresponding to pixels of a 4×4 matrix of a target pixel group PG_T. The position data PD may correspond to pixels of first to fourth columns C0 to C3 of each of first to fourth rows R0 to R3 by 4 bit units.

Therefore, in a case 1-1 of FIG. 5C, position data PD may have a data value "1110110011001100", and in a case 1-2, position data PD may have a data value "1100110111001100". Also, in a case 2-1 of FIG. 5D, position data PD may have a data value "1100111011011100", and in a case 1-2, position data PD may have a data value "1100110111001110".

Referring to FIG. 5E, a target pixel group PG_T may include 9 pixels of a 3×3 matrix, and one bad pixel BP may occur at a random position in the target pixel group PG_T.

Position data PD may include 9 bits corresponding to 9 pixels of a 3×3 matrix of the target pixel group PG_T and may correspond to pixels of first to third columns C0 to C2 of each of first to third rows R0 to R2 by 3 bit units.

Therefore, in a case 3-1 of FIG. 5E, position data PD may have a data value "100000000", and in a case 3-2, position data PD may have a data value "000010000".

Referring to FIG. 5F, a target pixel group PG_T may include 9 pixels of a 3×3 matrix, and two bad pixels BP may occur at random positions in the target pixel group PG_T.

In a case 4-1, position data PD may have a data value "100010000", and in a case 4-2, position data PD may have a data value "010010000".

Position data based on a type where a bad pixel occurs has been described above with reference to FIGS. 5A to 5F. In FIGS. 5A to 5F, an example has been described where one bad pixel or two bad pixels occur(s) randomly, but as described above with reference to FIGS. 5A to 5D, when a target pixel group PG_T includes 16 pixels of a 4×4 matrix and includes cluster bad pixels CBP of a 4×2 matrix, the number of bad pixels occurring at random may be one to eight. Also, as described above with reference to FIGS. 5E and 5F, when a target pixel group PG_T includes 16 pixels of a 3×3 matrix and does not include a cluster bad pixel, the number of bad pixels occurring at random may be one to nine. As described above, the number of bad pixels occurring at random positions in a target pixel group PG_T may be variable, and cases of bad pixels may vary based on the number and combination of bad pixels.

Figure 6:
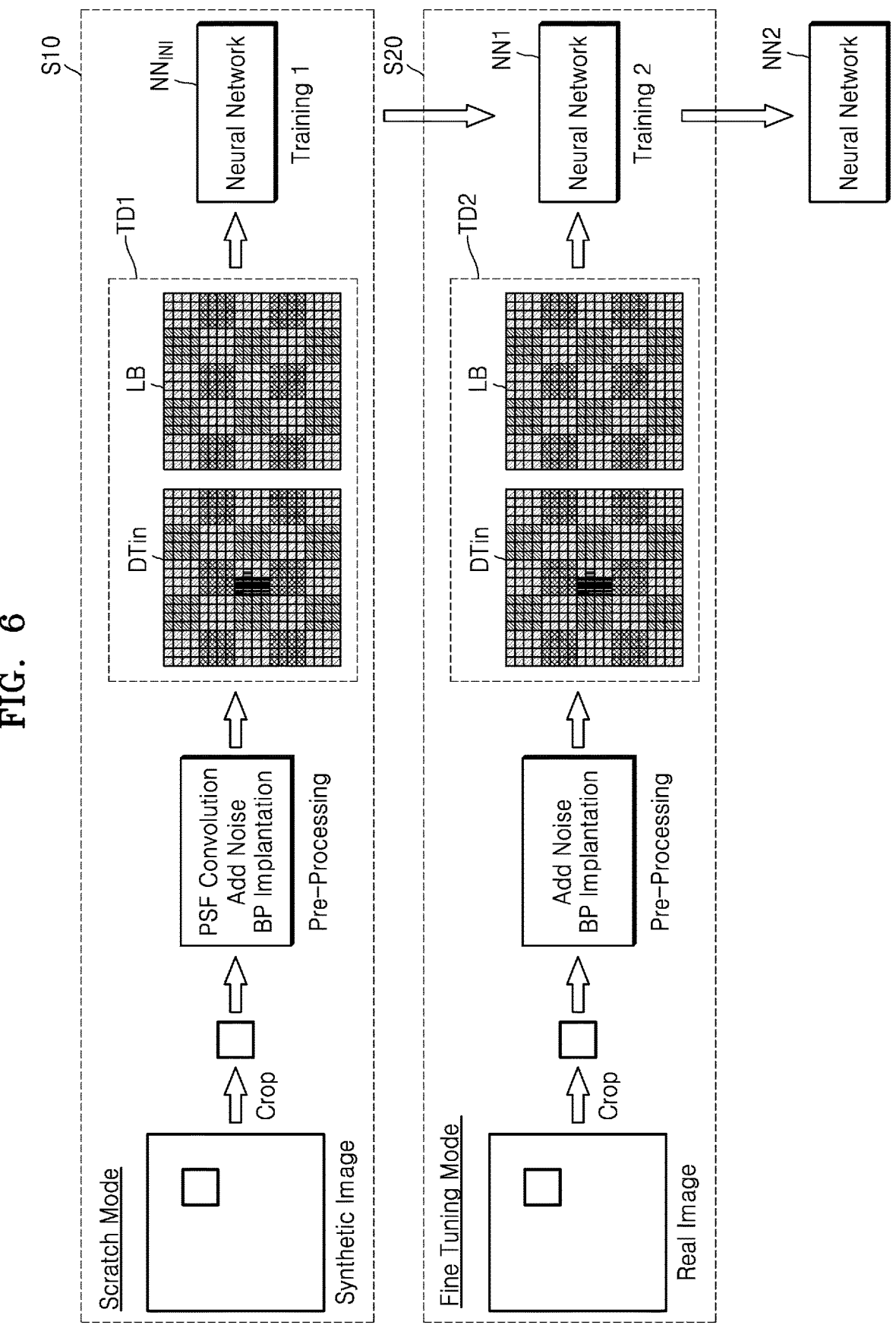
FIG. 6 illustrates a training operation of a neural network according to an embodiment.

FIG. 6 illustrates a training operation of a neural network NN according to an embodiment.

Referring to FIG. 6, a training operation of the neural network NN (or referred to as a training operation) may include a first training operation S10 and a second training operation S20. The first training operation S10 may be referred to as a scratch mode, and the second training operation S20 may be referred to as a fine tuning mode.

In the first training operation S10, first training may be performed on an initial neural network NN$_{INI}$, based on a synthetic image. The initial neural network NN$_{INI}$ may include untrained weights, and may include weights which are set as default values instead of weights determined through training.

A synthetic image including a simple image such as a circle, a triangle, or a tetragon may be prepared, and a portion of the synthetic image may be cropped. Pre-processing may be performed on a cropped image. For example, pre-processing in the first training operation S10 may include point spread function (PSF) convolution, noise addition, and bad pixel (BP) implantation.

Input data DTin including a bad pixel and a label LB including no cluster bad pixel may be generated based on pre-processing. In an embodiment, the input data DTin may include a cluster bad pixel occurring at a fixed position in a target pixel group and one or more bad pixels occurring randomly. However, the disclosure is not limited thereto, and the input data DTin may include one or more bad pixels occurring randomly in the target pixel group.

First training data DT1 may include the input data DTin and the label LB, which are generated based on the synthetic image. The first training data DT1 may include a plurality of a pair of input data DTin and labels LB.

The initial neural network NN$_{INI}$ may be trained based on the first training data TD1. Accordingly, a first neural network NN1 may be generated. The first neural network NN1 may include a deep learning model which is trained to correct a cluster bad pixel, based on the first training data TD1.

In the second training operation S20, second training may be performed on the first neural network NN1, based on a high-dimensional real image including a complicated shape. The first neural network NN1 may include weights which are trained in the first training operation S110. Here, the accuracy of the weights may not be high. In other words, the performance of the first neural network NN1 may not be high.

A high-dimensional real image may be prepared, and a portion of the real image may be cropped. Pre-processing may be performed on a cropped image. For example, pre-processing in the second training operation S20 may include noise addition and bad pixel (BP) implantation.

Input data DTin including a cluster bad pixel and a label LB including no cluster bad pixel may be generated based on pre-processing. Second training data DT2 may include the input data DTin and the label LB, which are generated based on the real image. The second training data DT2 may include a plurality of a pair of input data DTin and labels LB. The first neural network NN1 may be trained based on the second training data TD2. Accordingly, the second neural network NN2 (for example, a final trained neural network) may be generated. The second neural network NN2 may include a deep learning model which is trained to correct a cluster bad pixel, and the deep learning model may include finely tuned weights. The weights may be trained based on the real image, and the accuracy of the weights may be high. In other words, the performance of the second neural network NN2 may be high. The second neural network NN2 may be applied as the neural network NN of the image sensor (100 of FIG. 1).

At least one (hereinafter referred to as training data) of the first training data TD1 and the second training data TD2, as described above with reference to FIGS. 5A to 5F, may include a plurality of pairs of input data DTin and labels LB based on various bad pixel cases. In an embodiment, the training data may include a same number of pairs of input data DTin and labels LB by a plurality of bad pixel case units. For example, it is assumed that the training data includes ten pairs of input data DTin and labels LB by a plurality of bad pixel case units. The training data may include ten pairs of input data DTin and labels LB in the case 1-1 of FIG. 5A and may include ten pairs of input data DTin and labels LB in the case 1-2. In a case where a target pixel group includes one bad pixel occurring at random, there may be eight bad pixel cases, and training data may include ten pairs of input data DTin and labels LB by eight bad pixel case units. Accordingly, in a case where a target pixel group includes one bad pixel occurring at random, training data may include 80 pairs of input data DTin and labels LB.

Furthermore, in bad pixel cases each including a same number of bad pixels, patterns of bad pixels in two cases may be symmetrical with each other.

Figure 7:
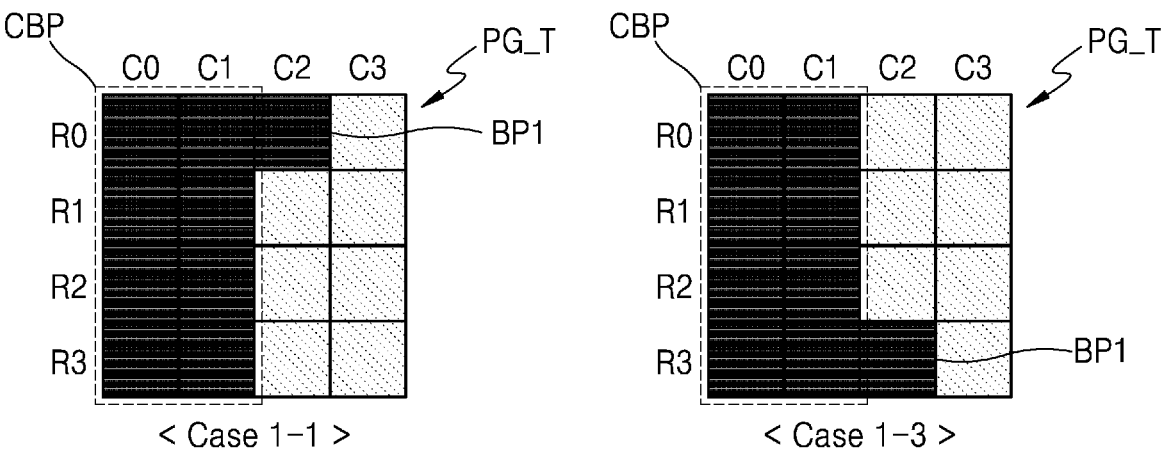
FIG. 7 illustrates cases where patterns of bad pixels are symmetrical with each other.

FIG. 7 illustrates cases where patterns of bad pixels are symmetrical with each other.

Referring to FIG. 7, cluster bad pixels CBP arranged in a 4×2 matrix and one random first bad pixel BP1 may occur in a target pixel group PG_T. In a case 1-1 and a case 1-3, patterns of bad pixels may be vertically symmetrical with each other. In this case, a neural network (for example, the initial neural network NN$_{INI}$ and/or the first neural network NN of FIG. 6) may be trained in one case of the case 1-1 and the case 1-3. In other words, training data may include a plurality of pairs of input data DTin and labels LB in one case (for example, the case 1-1) and may not include a pair of input data DTin and labels LB in the case 1-3. Therefore, a problem (for example, complexity of a bad pixel case) which has to be solved by a neural network may be reduced, and thus, the amount of training of a neural network and a time taken in training may decrease.

Furthermore, training of a neural network described above may be performed by a device (for example, a computing device) to which the neural network NN is applied, in an operation of manufacturing an image sensor, and for example, the computing device may include a processor and a memory. The memory may store training data (for example, the first training data TD1 and the second training data TD2) and weights. The processor may perform an arithmetic operation and verification on the training data, and thus, may train the initial neural network $NN_{INI}$ and the first neural network NN1.

Figure 8A:
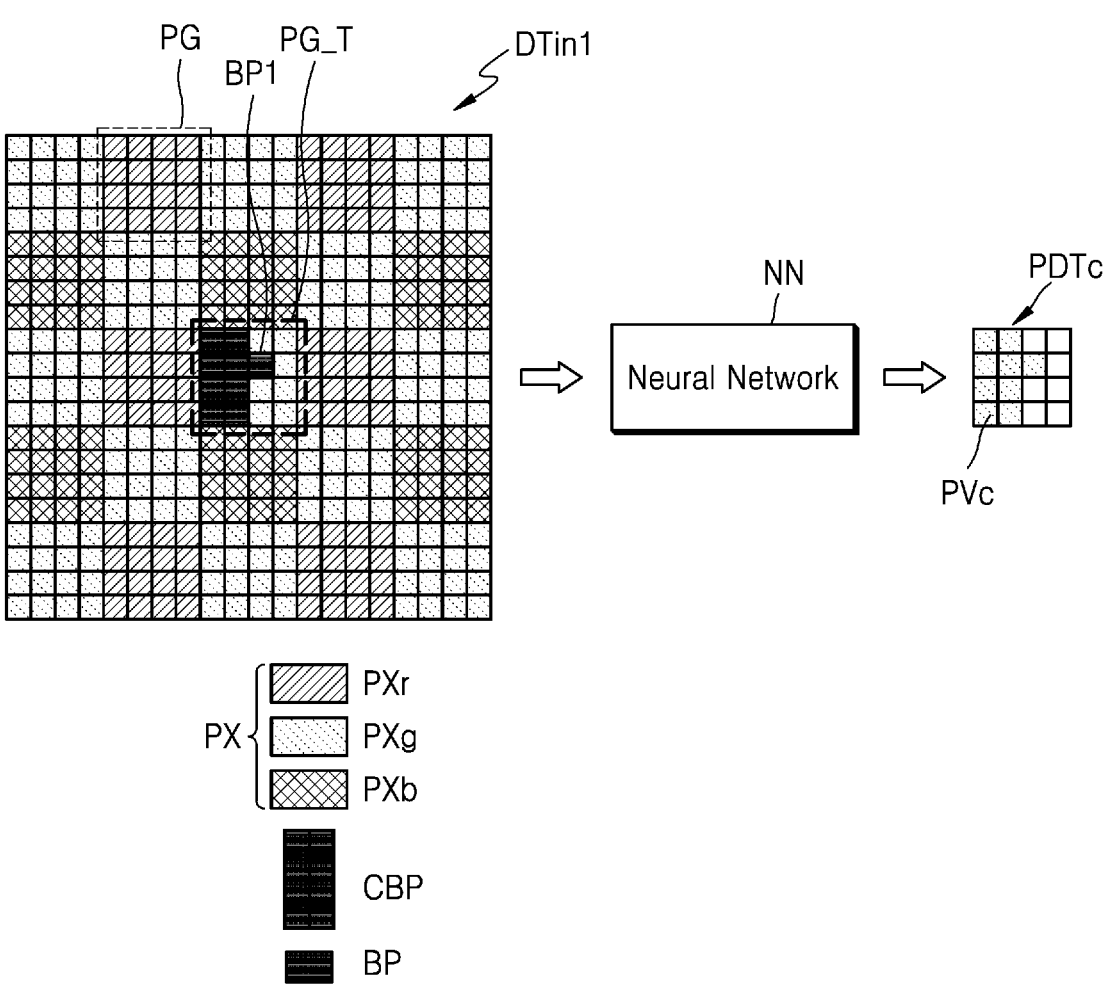
Figure 8B:
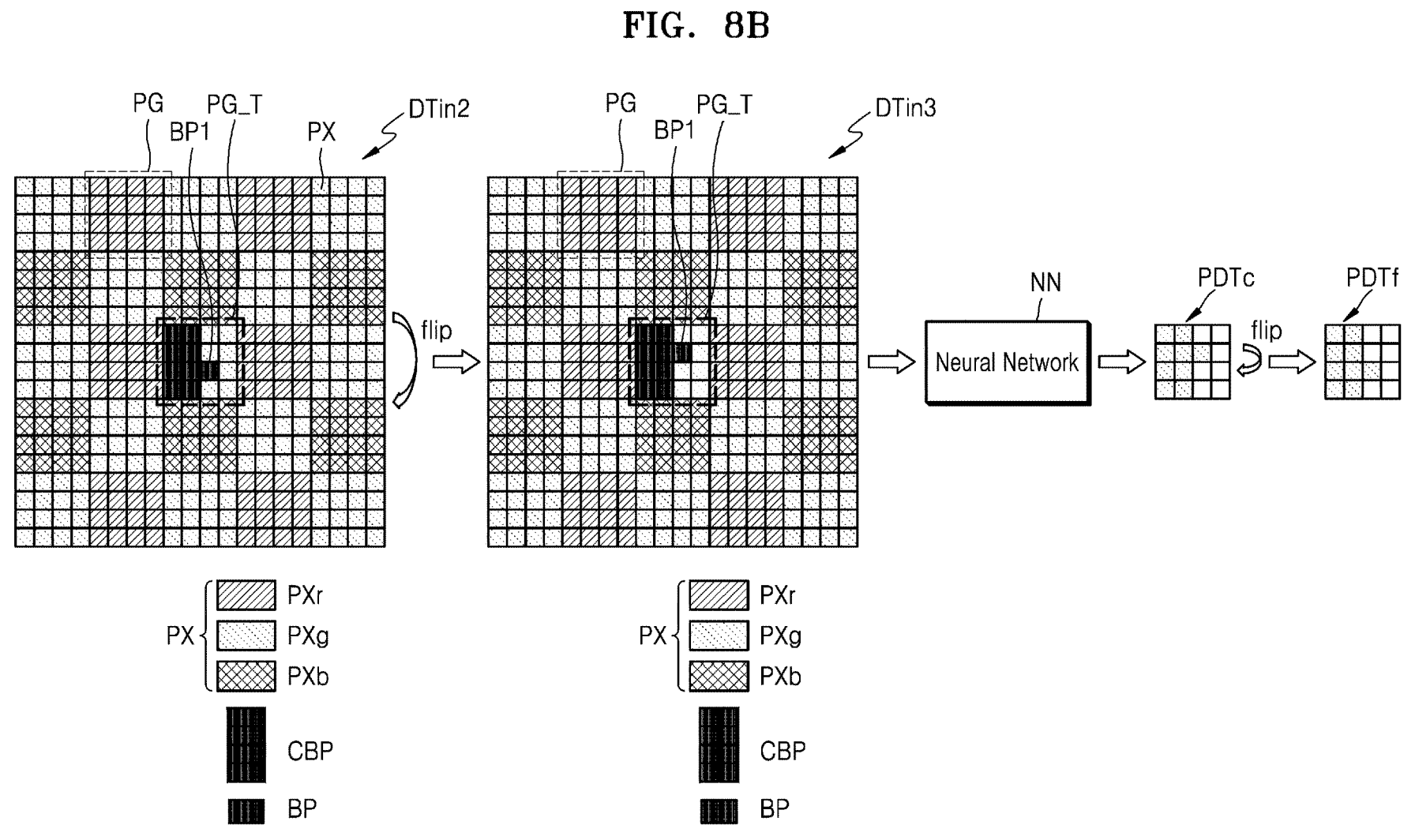

FIGS. 8A and 8B illustrate an operation of a bad pixel corrector according to an embodiment. FIG. 8A illustrates an operation of a bad pixel corrector when input data includes a bad pixel having a first pattern, and FIG. 8B illustrates an operation of a bad pixel corrector when input data includes a bad pixel having a second pattern.

Referring to FIG. 8A, first input data DTin1 may include a cluster bad pixel CBP arranged in a left portion in a target pixel group PG_T and one or more first bad pixels BP1 randomly occurring in a right portion thereof. As illustrated in FIG. 8A, a plurality of bad pixels BP may be arranged to have a first pattern in the target pixel group PG_T.

A neural network NN may include a deep neural model which is trained in a case including a bad pixel BP having the first pattern. First input data DTin1 may be input to the neural network NN, and the neural network NN may process the first input data DTin1 to generate corrected pixel data PDTc.

The corrected pixel data PDTc may include corrected pixel values PVc corresponding to each of the first bad pixels BP1 and bad pixels of the cluster bad pixel CBP. The corrected pixel data PDTc may replace the cluster bad pixel CBP and the first bad pixels BP1.

Referring to FIG. 8B, second input data DTin2 may include a cluster bad pixel CBP arranged in a left portion in a target pixel group PG_T and one or more first bad pixels BP1 randomly occurring in a right portion thereof. As illustrated in FIG. 8B, a plurality of bad pixels BP may be arranged to have a second pattern in the target pixel group PG_T of the second input data DTin2, and the second pattern may be symmetrical with the first pattern of FIG. 8A. For example, in the target pixel group PG_T, the second pattern may be vertically symmetrical with the first pattern of FIG. 8A.

A neural network NN may include a deep learning model which is trained to correct a bad pixel of the first pattern and may not be trained on a bad pixel of the second pattern. Accordingly, when the second input data DTin2 is input to the neural network NN, accurate corrected pixel data PDTc may not be generated.

The bad pixel corrector 20 may vertically flip the second input data DTin2 to generate third input data DTin3. As illustrated, the third input data DTin3 may include a plurality of bad pixels BP having the first pattern.

The third input data DTin3 may be input to the neural network NN, and the neural network NN may process the third input data DTin3 to generate corrected pixel data PDTc.

The bad pixel corrector 20 may vertically flip the corrected pixel data PDT to generate flipped pixel data PDTf. The flipped pixel data PDTf may correspond to bad pixels BP which are included in a cluster bad pixel CBP and a first bad pixel BP1 of the second input data DTin2. Corrected pixel values included in the flipped pixel data PDTf may be applied as pixel values of the bad pixels BP which are included in the cluster bad pixel CBP, and the first bad pixel BP1.

In FIGS. 8A and 8B, an example where patterns of bad pixels are vertically symmetrical with each other has been described. However, the disclosure is not limited thereto, and even when a first bad pattern and a second bad pixel of bad pixels are horizontally symmetrical with each other, bad pixel correction which is trained on one pattern based on an input data flip scheme may be performed on input data corresponding to the first pattern and the second pattern. Accordingly, as described above with reference to FIGS. 6 and 7, the amount of training of a neural network and a time taken in training may be reduced.

Figure 9:
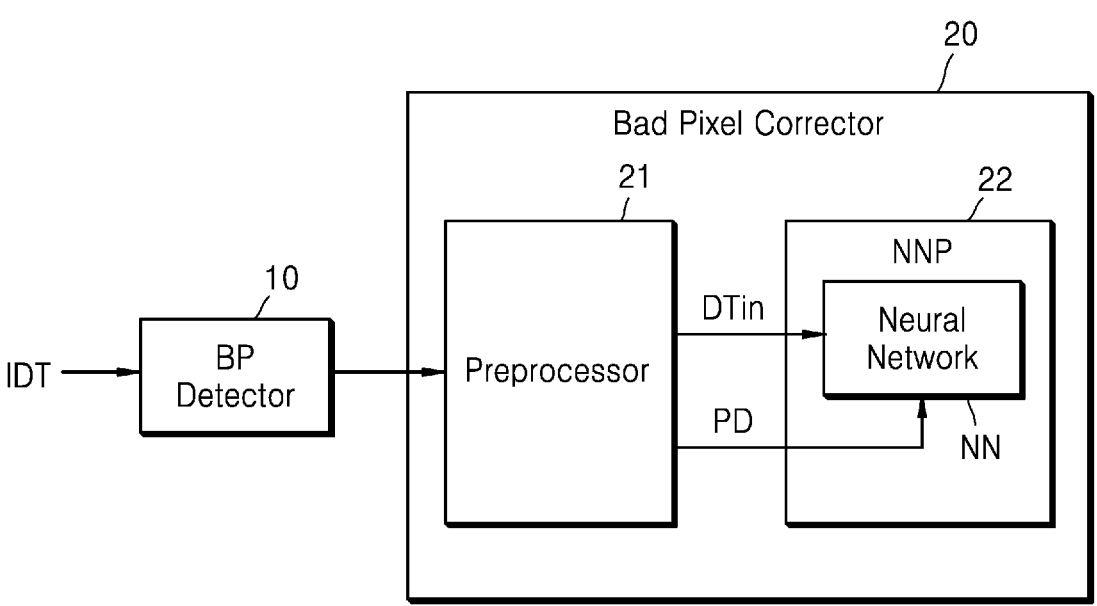
FIG. 9 is a block diagram schematically illustrating a bad pixel corrector according to an embodiment.

FIG. 9 is a block diagram schematically illustrating a bad pixel corrector 20 according to an embodiment. For convenience of description, a bad pixel detector 10 is illustrated together.

Referring to FIG. 9, the bad pixel corrector 20 may include a preprocessor 21 and a neural network processor (NNP) 22. The NNP 22 may perform bad pixel correction, based on a neural network. According to an embodiment, the preprocessor 21 and the neural network processor (NNP) 22 may be implemented hardware, software or a combination of hardware and software.

The preprocessor 21 may generate input data DTin including a bad pixel from image data including the bad pixel. As described above, the input data DTin may include a target pixel group including a bad pixel and a peripheral pixel group. In an embodiment, when a bad pixel has a second pattern, the preprocessor 21 may flip the input data DTin to generate flipped input data, or may flip (for example, horizontally flip or vertically flip) some image data including a peripheral pixel group and a target pixel group including the bad pixel to generate the input data DTin including a bad pixel having a first pattern.

Also, the preprocessor 21 may encode position information (for example, a bad pixel map) representing a position of a bad pixel to generate position data PD. When a bad pixel has the second pattern, the preprocessor 21 may generate the position data PD, based on flipped input data. The preprocessor 21 may provide the input data DTin and the position data PD to the NNP 22.

The NNP 20 may perform bad pixel correction by using a neural network NN, based on the input data DTin and the position data PD. The NNP 20 may input the input data DTin to an input layer of a plurality of layers of the neural network NN and may input the position data PD to one layer (for example, a middle layer) of the plurality of layers of the neural network NN. For example, the middle layer may be a fully connected layer.

In an embodiment, the bad pixel detector 10 may detect a bad pixel and a type of the bad pixel from image data IDT and may provide the bad pixel corrector 20 with information about the bad pixel. The preprocessor 21 may generate the input data DTin and the position data PD, based on position information about the bad pixel provided from the bad pixel detector 10. In an embodiment, the preprocessor 21 may flip the input data DTin, based on a pattern of the bad pixel provided from the bad pixel detector 10. However, the disclosure is not limited thereto, and the preprocessor 21 may generate the input data DTin including the bad pixel, detect a pattern of the bad pixel from the input data DTin, and flip the input data DTin, based on the detected pattern.

In an embodiment, the neural network may include a plurality of neural networks (for example, a first neural network and a second neural network) corresponding to a color of a pixel. For example, the first network 22 may correspond to a green channel, and the second network 23 may correspond to a non-green channel. For example, the first network 22 may include a deep learning model which is trained based on a case where a bad pixel occurs in a first green channel (or a second green channel), and the second network 23 may include a deep learning model which is trained based on a case where a bad pixel occurs in a red channel (or a blue channel). However, the disclosure is not limited thereto, and the neural network may include four networks respectively corresponding to a first green channel, a second green channel, a red channel, and a blue channel. The NNP 22 (or the preprocessor 21) may provide the input data DTin and the position data PD to a network corresponding to a channel where a bad pixel occurs.

FIG. 10 illustrates an implementation example of an image processor 130a according to an embodiment.

Referring to FIG. 10, the image processor 130a may include a bad pixel detector 10, a correction module 50, a binning module 60, and a remosaic module 70. The correction module 50 may include a static bad pixel corrector 20a, a dynamic bad pixel corrector 20b, and a merger 25.

The bad pixel detector 10 may detect a bad pixel from received image data IDT and may detect a type of the bad pixel, and for example, may detect whether the bad pixel is a static bad pixel, whether the bad pixel is a dynamic bad pixel, or whether the bad pixel includes a first cluster bad pixel of static bad pixels. Also, the bad pixel detector 10 may detect a position, a pattern, and/or a color channel of a static bad pixel. The bad pixel detector 10 may detect bad pixel information including a type, a position, a pattern, and/or a color channel of the static bad pixel.

When the static bad pixel is detected by the bad pixel detector 10, the image data IDT may be provided to the static bad pixel corrector 20a (hereinafter referred to as a static BPC). According to an embodiment, a portion of the image data including the static bad pixel may be provided to the static bad pixel corrector 20a. In an embodiment, the bad pixel information generated by the bad pixel detector 10 may be provided to the bad pixel corrector 20a along with the image data IDT.

The bad pixel corrector 20 described above with reference to FIGS. 1 to 9 may be applied as the static BPC 20a. The static BPC 20a may correct a bad pixel, based on deep learning, and at this time, the static BPC 20a may encode position information about the bad pixel to generate position data and may provide the position data to one layer of a neural network. When the bad pixel has a second pattern and the neural network is trained on a first pattern, the static BPC 20a may flip (vertically or horizontally flip) input data including the bad pixel to input flipped input data to the neural network.

When the dynamic bad pixel is detected by the bad pixel detector 10, the image data IDT may be provided to the dynamic bad pixel corrector 20b (hereinafter referred to as a dynamic BPC). According to an embodiment, a portion of image data including the dynamic bad pixel may be provided to the dynamic bad pixel corrector 20b. The dynamic BPC 20b may correct a bad pixel which randomly occurs in the image data IDT. In other words, the dynamic BPC 20b may generate pixel data corresponding to a random bad pixel.

The merger 25 may merge pieces of partial image data, received from the static BPC 20a and the dynamic BPC 20b, into one piece of corrected image data. The merger 25 may replace the static bad pixel of the image data IDT with corrected pixel data output from the static BPC 20a and may replace the dynamic bad pixel of the image data IDT with corrected pixel data output from the dynamic BPC 20b. Accordingly, image data where a bad pixel has been corrected may be generated.

In an embodiment, the correction module 50 may further include an element which performs various kinds of corrections. For example, the correction module 50 may further include a denoiser and may remove noise in the image data IDT.

The binning module 60 may bin received image data (for example, corrected image data IDTc) to reduce a resolution of the image data. The binning module 60 may decrease a resolution of the image data input through various schemes.

The remosaic module 70 (or referred to as a Bayer converter) may convert input image data into a Bayer pattern. As described above, the image data IDT output from the readout circuit (120 of FIG. 1) may include a super Bayer pattern. Therefore, image data (for example, corrected image data or image data where resolution has been reduced after correction) received by the remosaic model 70 may include the super Bayer pattern. The remosaic module 70 may perform remosaic processing on input image data including the super Bayer pattern to generate image data including a Bayer pattern. Accordingly, Bayer-pattern image data (Bayer IDT) may be generated. Image processing may be additionally performed on the Bayer-pattern image data (Bayer IDT) or the Bayer-pattern image data (Bayer IDT) may be compressed, and then, image processing-performed Bayer-pattern image data or compressed Bayer-pattern image data may be transferred to an external processor.

In an embodiment, the binning module 60 and/or the remosaic module 70 may be included in the external processor. Accordingly, the corrected image data output from the correction module 50 may be provided to the external processor.

Figure 11:
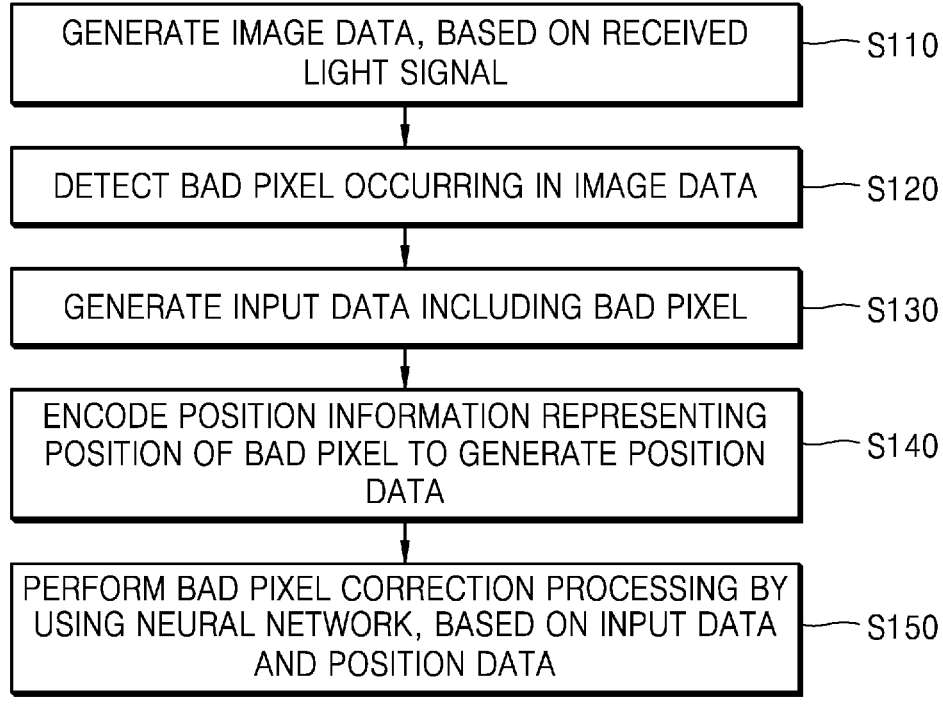
FIG. 11 is a flowchart illustrating an operation of an image sensor according to an embodiment.

FIG. 11 is a flowchart illustrating an operation of an image sensor according to an embodiment. Descriptions given above with reference to FIGS. 1 to 10 may be applied to an embodiment.

Referring to FIG. 11, an image sensor (100 of FIG. 1) may generate image data, based on a received light signal in operation S11. The pixel array 110 may convert a received light signal into electrical signals and may analog-digital convert the electrical signals to generate image data.

The image sensor 100 may detect a bad pixel occurring in the image data in operation S120. A bad pixel detector (10 of FIG. 1) may detect the bad pixel occurring in the image data. The bad pixel detector 10 may detect whether the bad pixel is a static bad pixel or whether the bad pixel is a random bad pixel and may detect a type and a pattern of a bad pixel and a position of the bad pixel. The pixel detector 10 may generate detected information as bad pixel information.

The image sensor 100 may generate input data including a bad pixel in operation S130. A bad pixel corrector (20 of FIG. 1) may generate input data including a target pixel group including a bad pixel and peripheral pixel groups, based on the image data. The target pixel group may be provided at a center of the input data. In an embodiment, when a neural network described below is trained on a bad pixel having a first pattern and the input data includes a bad pixel having a second pattern symmetrical with the first pattern, the bad pixel corrector 20 may flip (horizontally or vertically flip) the input data to generate flipped input data. The flipped input data may include the bad pixel having the first pattern.

The image sensor 100 may encode position information representing a position of the bad pixel to generate encoding data (i.e., position data) in operation S140. The position data may include a plurality of bits, and the plurality of bits may include a flag value representing whether each of corresponding pixels is a bad pixel or a normal pixel.

The image sensor 100 may perform bad pixel correction processing by using a neural network, based on the input data and the position data in operation S150. The bad pixel corrector 20 may input the input data to an input layer of the neural network and may input the position data to one layer (for example, a middle layer) of the neural network. The neural network may generate corrected pixel data including a corrected pixel value, based on the input data and the position data, and thus, may perform bad pixel correction. The corrected pixel value included in the corrected pixel data may be applied as a pixel value of the bad pixel. Accordingly, a bad pixel of image data may be corrected based on a neural network.

Figure 12:
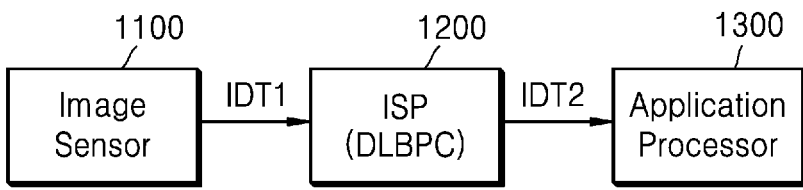
FIG. 12 is a block diagram schematically illustrating an image processing device according to an embodiment.

FIG. 12 is a block diagram schematically illustrating an image processing device 1000 according to an embodiment.

Referring to FIG. 12, the image processing device 1000 (or an imaging device) may include an image sensor 1100, an image signal processor (ISP) 1200, and an application processor 1300. The image sensor 1000 may include a pixel array and a readout circuit and may output original image data as first image data IDT1.

The image processor 1200 may include a bad pixel detector (20 of FIG. 1) and an image signal processor (130 of FIG. 1) including the bad pixel detector 20, each described above with reference to FIGS. 1 to 10. For example, the image processor 1200 may include a DLBPC. The image signal processor 1200 may perform bad pixel correction based on a neural network on first image data IDT to generate second image data IDT2.

The application processor 1300 may perform an additional operation, based on the second image data IDT2 received from the image processor 1200. In an embodiment, the application processor 1300 may include an image processing circuit for performing image processing of a level which is higher than the image signal processor 1200, and the image processing circuit may perform image processing on the second image data IDT2. For example, the image processing circuit may change a data format of the second image data IDT2, or may adjust sharpness, contrast, or a size of the second image data IDT2. As another example, the image processing circuit may perform high dynamic range (HDR) processing on a plurality of second image data IDT2 having different luminance to generate an HDR image where a dynamic range has increased.

Figure 13:
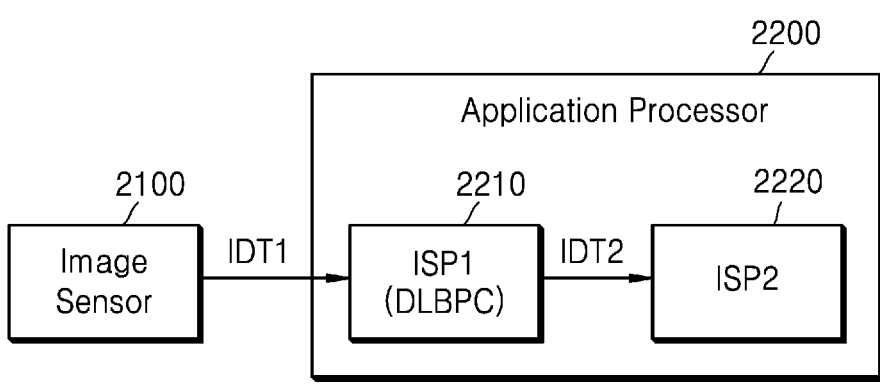
FIG. 13 is a block diagram schematically illustrating an image processing device according to an embodiment.

FIG. 13 is a block diagram schematically illustrating an image processing device 2000 according to an embodiment.

Referring to FIG. 13, the image processing device 2000 may include an image sensor 2100 and an application processor 2200. The application processor 2200 may include a first image signal processor 2210 and a second image signal processor 2220.

The first image signal processor 2210 may receive first image data IDT1 from the image sensor 2100 and may perform image processing such as bad pixel correction and noise removal on the first image data IDT1. A bad pixel detector (20 of FIG. 1) and an image signal processor (130 of FIG. 1) each described above with reference to FIGS. 1 to 10 may be applied to the first image signal processor 2210. The first image signal processor 2210 may receive the first image data IDT1 from the image sensor 2100 and may perform bad pixel correction based on a neural network on the first image data IDT1.

The second image signal processor 2220 may perform image processing of a level which is higher than the first image signal processor 2210. For example, the second image signal processor 2220 may perform image processing, such as color coordinate change, brightness adjustment, sharpness adjustment, contrast adjustment, and HDR processing, on the second image data IDT2.

Figure 14:
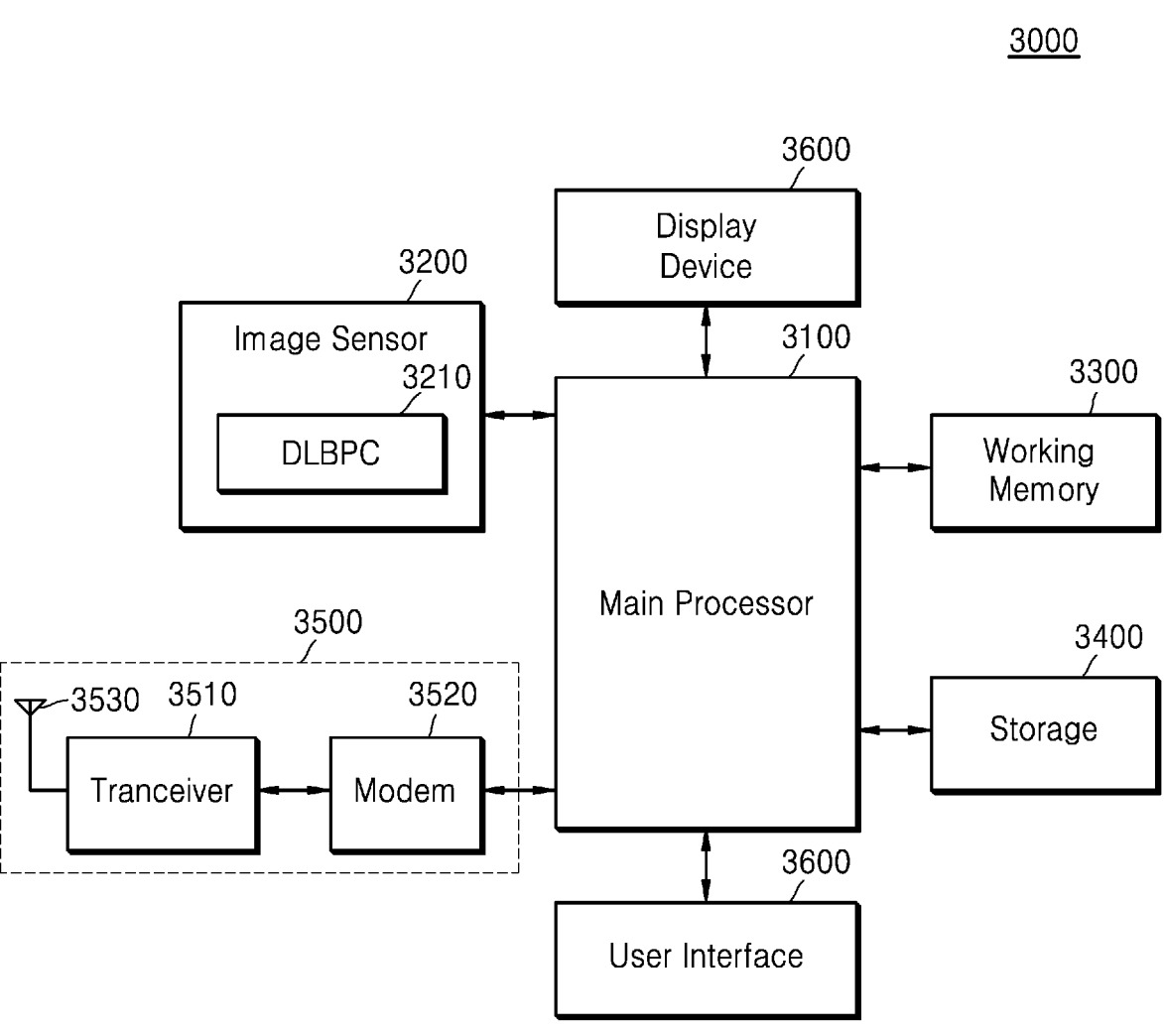
FIG. 14 is a block diagram illustrating an electronic device including an image sensor, according to an embodiment.

FIG. 14 is a block diagram illustrating an electronic device 3000 including an image sensor, according to an embodiment. The electronic device 3000 of FIG. 14 may be a portable terminal.

Referring to FIG. 14, the electronic device 3000 may include a main processor 3100, an image sensor 3200, a display device 3600, a working memory 3300, a storage 3400, a user interface 3700, and a wireless transceiver 3500.

The main processor 3100 may control an overall operation of the electronic device 3000 and may be implemented as a system on chip (SoC) which drives an application program and an operating system (OS). The main processor 3100 may provide the display device 3600 with image data provided from the image sensor 3200, or may store the image data in the storage 3400. In an embodiment, the main processor 3100 may include an image processing circuit and may perform image processing, such as image quality adjustment and data format change, on the image data received from the image sensor 3200.

The image sensor 100 described above with reference to FIGS. 1 to 11 may be applied as the image sensor 3200. The image sensor 3200 may include a deep learning-based bad pixel corrector (DLBPC) 3210. The bad pixel corrector 3210 may perform deep learning-based bad pixel correction on a bad pixel which occurs at a fixed position of the image data. The bad pixel corrector 3210 may include a neural network which is weight-lightened and may intactly provide input data including the bad pixel to the neural network or may flip the input data and may input the flipped input data to the neural network, thereby correcting the bad pixel in real time.

The working memory 3300 may be implemented as a volatile memory, such as dynamic random access memory (RAM) (DRAM) or static RAM (SRMA), or a non-volatile resistive memory such as ferroelectric RAM (FeRAM), resistive RAM (RRAM), or phase-change RAM (PRAM). The working memory 3300 may store programs and/or data, which are/is processed or executed by the main processor 3100.

The storage 3400 may be implemented as a non-volatile memory device such as NAND flash memory or resistive memory, and for example, may be provided as a memory card such as multi-media card (MMC), embedded MMC (eMMC), secure digital (SD) card, or micro SD card. The storage 3400 may store the image data provided from the image sensor 3200.

The user interface 3700 may be implemented with various devices, such as a keyboard, a curtain key panel, a touch panel, a fingerprint sensor, and a microphone, for receiving a user input. The user interface 3700 may receive the user input and may provide the main processor 3100 with a signal corresponding to the received user input.

The wireless transceiver 3500 may include a transceiver 3510, a modem 3520, and an antenna 3530. The wireless transceiver 3500 may receive or transmit data through wireless communication with an external device.

Hereinabove, exemplary embodiments have been described in the drawings and the specification. Embodiments have been described by using the terms described herein, but this has been merely used for describing the inventive concept and has not been used for limiting a meaning or limiting the scope of the inventive concept defined in the following claims. Therefore, it may be understood by those of ordinary skill in the art that various modifications and other equivalent embodiments may be implemented from the inventive concept.

While the inventive concept has been particularly shown and described with reference to embodiments thereof, it will be understood that various changes in form and details may be made therein without departing from the spirit and scope of the following claims.

What is claimed is:

1. An image sensor comprising:
a pixel array comprising a plurality of pixels each configured to convert a received light signal into an electrical signal;
a readout circuit configured to convert the electrical signal from each of the plurality of pixels into image data and output the image data; and
an image signal processor configured to:
provide the image data to an input layer, among a plurality of layers of a neural network,
generate position data based on position information representing a position of at least one bad pixel among one or more bad pixels in a first pixel group of the image data,
provide the position data to a middle layer among the plurality of layers of the neural network, and
correct the one or more bad pixels in the first pixel group of the image data based on the neural network.

2. The image sensor of claim 1, wherein the image signal processor is further configured to provide an output of a layer, preceding the middle layer, and the position data as an input to the middle layer.

3. The image sensor of claim 1, wherein the middle layer comprises a fully connected layer.

4. The image sensor of claim 1, wherein the image data comprises a plurality of pixel groups each comprising a plurality of pixels of a same color arranged in an N×N matrix (where N is an integer of 2 or more),
wherein the one or more bad pixels comprises at least one first bad pixel and second bad pixels arranged in an M×K matrix (where M is an integer of 2 or more and less than N, and K is an integer of 1 or more and N or less), and
wherein the position information represents a position of the at least one first bad pixel.

5. The image sensor of claim 4, wherein the position data comprises N×(N−K) number of bits corresponding to pixels arranged in an N×(N−K) matrix comprising the at least one bad pixel and not including second bad pixels of the M×K matrix among pixels of the first pixel group arranged in the N×N matrix.

6. The image sensor of claim 5, wherein each of the N×(N−K) bits comprises a 1-bit flag representing whether a corresponding pixel is a bad pixel.

7. The image sensor of claim 4, wherein the image data comprises N×N number of bits corresponding to each of pixels arranged in the N×N matrix.

8. The image sensor of claim 1, wherein the image signal processor is further configured to correct the one or more bad pixels in the first pixel group by:
generating input data comprising the first pixel group and one or more second pixel groups arranged at a periphery of the first pixel group, and
processing the input data, based on the neural network.

9. The image sensor of claim 8, wherein the image signal processor is further configured to:
flip the input data to generate flipped input data arranged in a second direction symmetrical with an arrangement of the input data in a first direction, and
process the flipped input data, based on the neural network.

10. The image sensor of claim 9, wherein the image signal processor is further configured to encode position information representing the position of the at least one bad pixel to generate the position data, based on the flipped input data.

11. An image signal processor comprising:
a preprocessor configured to:
generate input image data comprising a plurality of bad pixels from image data, and
encode position information representing positions of the plurality of bad pixels to generate encoding data comprising a plurality of bits; and
a neural network processor configured to perform bad pixel correction based on the input image data and the encoding data input to a neural network,
wherein the input image data and the encoding data are separately input into different layers of the neural network.

12. The image signal processor of claim 11, wherein the preprocessor is further configured to directly input the encoding data to a middle layer, among a plurality of layers of the neural network.

13. The image signal processor of claim 12, wherein the image data comprises a plurality of pixel groups each comprising a plurality of pixels of a same color arranged in an N×N matrix (where N is an integer of 2 or more), and
wherein the input image data comprises a target pixel group comprising the plurality of bad pixels and peripheral pixel groups of the target pixel group among the plurality of pixel groups.

14. The image signal processor of claim 13, wherein the encoding data comprises N×N number of bits corresponding to each of pixels arranged in the N×N matrix in the target pixel group comprising the plurality of bad pixels among the plurality of pixel groups, and each of the N×N bits represents whether a corresponding pixel is a bad pixel.

15. The image signal processor of claim 13, wherein the plurality of bad pixels comprises at least one first bad pixel and second bad pixels arranged in an M×K matrix (where M is an integer of 2 or more and less than N, and K is an integer of 1 or more and N or less), and
the preprocessor is further configured to encode position information about the at least one first bad pixel to generate the encoding data.

16. The image signal processor of claim 15, wherein the neural network comprises at least one convolution layer and at least one fully connected layer, and
wherein the middle layer comprises a fully connected layer.

17. The image signal processor of claim 13, wherein the preprocessor is further configured to, when the plurality of bad pixels are arranged to have a second pattern in the target pixel group, flip the input data to generate flipped input image data, and provide the flipped input image data to the neural network, and
wherein the neural network is trained to perform the bad pixel correction, based on training data where the plurality of bad pixels are arranged to have a first pattern symmetrical with the second pattern in the target pixel group.

18. An operating method of an image sensor for correcting one or more bad pixels using a neural network, the operating method comprising:
generating image data based on a received light signal;
providing the image data to an input layer, among a plurality of layers of the neural network;
generating position data based on position information representing a position of at least one bad pixel among the one or more bad pixels in a first pixel group of the image data;

providing the position data to a middle layer among the plurality of layers of the neural network; and correcting the one or more bad pixels in the first pixel group of the image data based on the neural network.

19. The operating method of claim 18, wherein the first pixel group comprises pixels of a same color arranged in an N×N matrix (where N is an integer of 2 or more), and wherein the position data comprises N×N number of bits corresponding to each of pixels the of the N×N matrix.

20. The operating method of claim 18, further comprising, when the at least one bad pixel is arranged to have a first pattern in the first pixel group, generating partial image data comprising the first pixel group and peripheral pixel groups of the first pixel group and flipping the partial image data to generate the input image data.

* * * * *